(12) United States Patent
Gorrell et al.

(10) Patent No.: US 7,728,397 B2
(45) Date of Patent: Jun. 1, 2010

(54) COUPLED NANO-RESONATING ENERGY EMITTING STRUCTURES

(75) Inventors: Jonathan Gorrell, Gainesville, FL (US); Mark Davidson, Florahome, FL (US); Jean Tokarz, Hawthorne, FL (US)

(73) Assignee: Virgin Islands Microsystems, Inc., St. Thomas, VI (US)

( * ) Notice: Subject to any disclaimer, the term of this patent is extended or adjusted under 35 U.S.C. 154(b) by 98 days.

(21) Appl. No.: 11/418,123

(22) Filed: May 5, 2006

(65) Prior Publication Data
US 2007/0257620 A1 Nov. 8, 2007

(51) Int. Cl.
*G09G 3/06* (2006.01)
(52) U.S. Cl. .......................................... 257/429; 372/2
(58) Field of Classification Search .................. 257/429; 372/2, 102
See application file for complete search history.

(56) References Cited

U.S. PATENT DOCUMENTS

| | | |
|---|---|---|
| 1,948,384 A | 2/1934 | Lawrence |
| 2,307,086 A | 1/1943 | Varian et al. |
| 2,431,396 A | 11/1947 | Hansell |
| 2,473,477 A | 6/1949 | Smith |
| 2,634,372 A | 4/1953 | Salisbury |
| 2,932,798 A | 4/1960 | Kerst et al. |
| 2,944,183 A | 7/1960 | Drexler |
| 2,966,611 A | 12/1960 | Sandstrom |
| 3,231,779 A | 1/1966 | White |
| 3,274,428 A | 9/1966 | Harris |
| 3,297,905 A | 1/1967 | Rockwell et al. |
| 3,315,117 A | 4/1967 | Udelson |
| 3,387,169 A | 6/1968 | Farney |
| 3,543,147 A | 11/1970 | Kovarik |
| 3,546,524 A | 12/1970 | Stark |
| 3,560,694 A | 2/1971 | White |

(Continued)

FOREIGN PATENT DOCUMENTS

EP 0237559 B1 12/1991

(Continued)

OTHER PUBLICATIONS

Brau et al., "Tribute to John E. Walsh", Nuclear Instruments and Methods in Physics Research Section A: Accelerators, Spectrometers, Detectors and Associated Equipment, vol. 475, Issues 1-3, Dec. 21, 2001, pp. xiii-xiv.*

(Continued)

*Primary Examiner*—Thomas L Dickey
(74) *Attorney, Agent, or Firm*—Davidson Berquist Jackson & Gowdey, LLP

(57) ABSTRACT

A nano-resonating structure constructed and adapted to couple energy from a beam of charged particles into said nano-resonating structure and to transmit coupled energy outside the nano-resonating structure. A plurality of the nano-resonant substructures may be formed adjacent one another in a stacked array, and each may have various shapes, including segmented portions of shaped structures, circular, semi-circular, oval, square, rectangular, semi-rectangular, C-shaped, U-shaped and other shapes as well as designs having a segmented outer surface or area, and arranged in a vertically stacked array comprised of one or more ultra-small resonant structures. The vertically stacked arrays may be symmetric or asymmetric, tilted, and/or staggered.

16 Claims, 7 Drawing Sheets

U.S. PATENT DOCUMENTS

| | | |
|---|---|---|
| 3,571,642 A | 3/1971 | Westcott |
| 3,586,899 A | 6/1971 | Fleisher |
| 3,761,828 A | 9/1973 | Pollard et al. |
| 3,886,399 A | 5/1975 | Symons |
| 3,923,568 A | 12/1975 | Bersin |
| 3,989,347 A | 11/1976 | Eschler |
| 4,053,845 A | 10/1977 | Gould |
| 4,269,672 A | 5/1981 | Inoue |
| 4,282,436 A | 8/1981 | Kapetanakos |
| 4,296,354 A | 10/1981 | Neubauer |
| 4,450,554 A | 5/1984 | Steensma et al. |
| 4,453,108 A | 6/1984 | Freeman, Jr. |
| 4,482,779 A | 11/1984 | Anderson |
| 4,528,659 A | 7/1985 | Jones, Jr. |
| 4,589,107 A | 5/1986 | Middleton et al. |
| 4,598,397 A | 7/1986 | Nelson et al. |
| 4,630,262 A | 12/1986 | Callens et al. |
| 4,652,703 A | 3/1987 | Lu et al. |
| 4,661,783 A | 4/1987 | Gover et al. |
| 4,704,583 A | 11/1987 | Gould |
| 4,712,042 A | 12/1987 | Hamm |
| 4,713,581 A | 12/1987 | Haimson |
| 4,727,550 A | 2/1988 | Chang et al. |
| 4,740,963 A | 4/1988 | Eckley |
| 4,740,973 A | 4/1988 | Madey |
| 4,746,201 A | 5/1988 | Gould |
| 4,761,059 A | 8/1988 | Yeh et al. |
| 4,782,485 A | 11/1988 | Gollub |
| 4,789,945 A | 12/1988 | Niijima |
| 4,806,859 A | 2/1989 | Hetrick |
| 4,809,271 A | 2/1989 | Kondo et al. |
| 4,813,040 A | 3/1989 | Futato |
| 4,819,228 A | 4/1989 | Baran et al. |
| 4,829,527 A | 5/1989 | Wortman et al. |
| 4,838,021 A | 6/1989 | Beattie |
| 4,841,538 A | 6/1989 | Yanabu et al. |
| 4,864,131 A | 9/1989 | Rich et al. |
| 4,866,704 A | 9/1989 | Bergman |
| 4,866,732 A | 9/1989 | Carey et al. |
| 4,873,715 A | 10/1989 | Shibata |
| 4,887,265 A | 12/1989 | Felix |
| 4,890,282 A | 12/1989 | Lambert et al. |
| 4,898,022 A | 2/1990 | Yumoto et al. |
| 4,912,705 A | 3/1990 | Paneth et al. |
| 4,932,022 A | 6/1990 | Keeney et al. |
| 4,981,371 A | 1/1991 | Gurak et al. |
| 5,023,563 A | 6/1991 | Harvey et al. |
| 5,036,513 A | 7/1991 | Greenblatt |
| 5,065,425 A | 11/1991 | Lecomte et al. |
| 5,113,141 A | 5/1992 | Swenson |
| 5,121,385 A | 6/1992 | Tominaga et al. |
| 5,127,001 A | 6/1992 | Steagall et al. |
| 5,128,729 A | 7/1992 | Alonas et al. |
| 5,130,985 A | 7/1992 | Kondo et al. |
| 5,150,410 A | 9/1992 | Bertrand |
| 5,155,726 A | 10/1992 | Spinney et al. |
| 5,157,000 A | 10/1992 | Elkind et al. |
| 5,163,118 A | 11/1992 | Lorenzo et al. |
| 5,185,073 A | 2/1993 | Bindra |
| 5,187,591 A | 2/1993 | Guy et al. |
| 5,199,918 A | 4/1993 | Kumar |
| 5,214,650 A | 5/1993 | Renner et al. |
| 5,233,623 A | 8/1993 | Chang |
| 5,235,248 A | 8/1993 | Clark et al. |
| 5,262,656 A | 11/1993 | Blondeau et al. |
| 5,263,043 A | 11/1993 | Walsh |
| 5,268,693 A | 12/1993 | Walsh |
| 5,268,788 A | 12/1993 | Fox et al. |
| 5,282,197 A | 1/1994 | Kreitzer |
| 5,283,819 A | 2/1994 | Glick et al. |
| 5,293,175 A | 3/1994 | Hemmie et al. |
| 5,302,240 A | 4/1994 | Hori et al. |
| 5,305,312 A | 4/1994 | Fornek et al. |
| 5,341,374 A | 8/1994 | Lewen et al. |
| 5,354,709 A | 10/1994 | Lorenzo et al. |
| 5,446,814 A | 8/1995 | Kuo et al. |
| 5,485,277 A | 1/1996 | Foster |
| 5,504,341 A | 4/1996 | Glavish |
| 5,578,909 A | 11/1996 | Billen |
| 5,604,352 A | 2/1997 | Schuetz |
| 5,608,263 A | 3/1997 | Drayton et al. |
| 5,637,966 A | 6/1997 | Umstadter et al. |
| 5,663,971 A | 9/1997 | Carlsten |
| 5,666,020 A | 9/1997 | Takemura |
| 5,668,368 A | 9/1997 | Sakai et al. |
| 5,705,443 A | 1/1998 | Stauf et al. |
| 5,737,458 A | 4/1998 | Wojnarowski et al. |
| 5,744,919 A | 4/1998 | Mishin et al. |
| 5,757,009 A | 5/1998 | Walstrom |
| 5,767,013 A | 6/1998 | Park |
| 5,780,970 A | 7/1998 | Singh et al. |
| 5,790,585 A | 8/1998 | Walsh |
| 5,811,943 A | 9/1998 | Mishin et al. |
| 5,821,836 A | 10/1998 | Katehi et al. |
| 5,821,902 A | 10/1998 | Keen |
| 5,825,140 A | 10/1998 | Fujisawa |
| 5,831,270 A | 11/1998 | Nakasuji |
| 5,847,745 A | 12/1998 | Shimizu et al. |
| 5,858,799 A | 1/1999 | Yee et al. |
| 5,889,449 A | 3/1999 | Fiedziuszko |
| 5,889,797 A | 3/1999 | Nguyen |
| 5,902,489 A | 5/1999 | Yasuda et al. |
| 5,963,857 A | 10/1999 | Greywall |
| 5,972,193 A | 10/1999 | Chou et al. |
| 6,005,347 A | 12/1999 | Lee |
| 6,008,496 A | 12/1999 | Winefordner et al. |
| 6,040,625 A | 3/2000 | Ip |
| 6,060,833 A | 5/2000 | Velazco |
| 6,080,529 A | 6/2000 | Ye et al. |
| 6,117,784 A | 9/2000 | Uzoh |
| 6,139,760 A * | 10/2000 | Shim et al. ............... 216/24 |
| 6,180,415 B1 | 1/2001 | Schultz et al. |
| 6,195,199 B1 | 2/2001 | Yamada |
| 6,210,555 B1 | 4/2001 | Taylor et al. |
| 6,222,866 B1 | 4/2001 | Seko |
| 6,278,239 B1 | 8/2001 | Caporaso et al. |
| 6,281,769 B1 | 8/2001 | Fiedziuszko |
| 6,297,511 B1 | 10/2001 | Syllaios et al. |
| 6,301,041 B1 | 10/2001 | Yamada |
| 6,303,014 B1 | 10/2001 | Taylor et al. |
| 6,309,528 B1 | 10/2001 | Taylor et al. |
| 6,316,876 B1 | 11/2001 | Tanabe |
| 6,338,968 B1 | 1/2002 | Hefti |
| 6,370,306 B1 | 4/2002 | Sato et al. |
| 6,373,194 B1 | 4/2002 | Small |
| 6,376,258 B2 | 4/2002 | Hefti |
| 6,407,516 B1 | 6/2002 | Victor |
| 6,441,298 B1 | 8/2002 | Thio |
| 6,448,850 B1 | 9/2002 | Yamada |
| 6,453,087 B2 | 9/2002 | Frish et al. |
| 6,470,198 B1 | 10/2002 | Kintaka et al. |
| 6,504,303 B2 | 1/2003 | Small |
| 6,524,461 B2 | 2/2003 | Taylor et al. |
| 6,525,477 B2 | 2/2003 | Small |
| 6,534,766 B2 | 3/2003 | Abe et al. |
| 6,545,425 B2 | 4/2003 | Victor |
| 6,552,320 B1 | 4/2003 | Pan |
| 6,577,040 B2 | 6/2003 | Nguyen |
| 6,580,075 B2 | 6/2003 | Kametani et al. |
| 6,603,781 B1 | 8/2003 | Stinson et al. |
| 6,603,915 B2 | 8/2003 | Glebov et al. |
| 6,624,916 B1 | 9/2003 | Green et al. |
| 6,636,185 B1 | 10/2003 | Spitzer et al. |
| 6,636,534 B2 | 10/2003 | Madey et al. |

| | | | | | |
|---|---|---|---|---|---|
| 6,636,653 B2 | 10/2003 | Miracky et al. | 2002/0053638 A1 | 5/2002 | Winkler et al. |
| 6,640,023 B2 | 10/2003 | Miller et al. | 2002/0056645 A1 | 5/2002 | Taylor et al. |
| 6,642,907 B2 | 11/2003 | Hamada et al. | 2002/0068018 A1 | 6/2002 | Pepper et al. |
| 6,687,034 B2 | 2/2004 | Wine et al. | 2002/0070671 A1 | 6/2002 | Small |
| 6,700,748 B1 | 3/2004 | Cowles et al. | 2002/0071457 A1 | 6/2002 | Hogan |
| 6,724,486 B1 | 4/2004 | Shull et al. | 2002/0122531 A1 | 9/2002 | Whitham |
| 6,738,176 B2 | 5/2004 | Rabinowitz et al. | 2002/0135665 A1 | 9/2002 | Gardner |
| 6,741,781 B2 | 5/2004 | Furuyama | 2002/0139961 A1 | 10/2002 | Kinoshita et al. |
| 6,777,244 B2 | 8/2004 | Pepper et al. | 2002/0158295 A1 | 10/2002 | Armgarth et al. |
| 6,782,205 B2 | 8/2004 | Trisnadi et al. | 2002/0191650 A1 | 12/2002 | Madey et al. |
| 6,791,438 B2 | 9/2004 | Takahashi et al. | 2003/0010979 A1 | 1/2003 | Pardo |
| 6,800,877 B2 | 10/2004 | Victor et al. | 2003/0012925 A1 | 1/2003 | Gorrell |
| 6,801,002 B2 | 10/2004 | Victor et al. | 2003/0016421 A1 | 1/2003 | Small |
| 6,819,432 B2 | 11/2004 | Pepper et al. | 2003/0034535 A1 | 2/2003 | Barenburu et al. |
| 6,829,286 B1 | 12/2004 | Guilfoyle et al. | 2003/0103150 A1 | 6/2003 | Catrysse et al. |
| 6,834,152 B2 | 12/2004 | Gunn et al. | 2003/0106998 A1 | 6/2003 | Colbert et al. |
| 6,870,438 B1 | 3/2005 | Shino et al. | 2003/0155521 A1 | 8/2003 | Feuerbaum |
| 6,871,025 B2 | 3/2005 | Maleki et al. | 2003/0158474 A1 | 8/2003 | Scherer et al. |
| 6,885,262 B2 | 4/2005 | Nishimura et al. | 2003/0164947 A1 | 9/2003 | Vaupel |
| 6,900,447 B2 | 5/2005 | Gerlach et al. | 2003/0179974 A1 | 9/2003 | Estes et al. |
| 6,908,355 B2 | 6/2005 | Habib et al. | 2003/0206708 A1 | 11/2003 | Estes et al. |
| 6,909,092 B2 | 6/2005 | Nagahama | 2003/0214695 A1 | 11/2003 | Abramson et al. |
| 6,909,104 B1 | 6/2005 | Koops | 2003/0222579 A1 | 12/2003 | Habib et al. |
| 6,924,920 B2 | 8/2005 | Zhilkov | 2004/0011432 A1 | 1/2004 | Podlaha et al. |
| 6,936,981 B2 | 8/2005 | Gesley | 2004/0061053 A1 | 4/2004 | Taniguchi et al. |
| 6,943,650 B2 | 9/2005 | Ramprasad et al. | 2004/0080285 A1 | 4/2004 | Victor et al. |
| 6,944,369 B2 | 9/2005 | Deliwala | 2004/0085159 A1 | 5/2004 | Kubena et al. |
| 6,952,492 B2 | 10/2005 | Tanaka et al. | 2004/0092104 A1 | 5/2004 | Gunn, III et al. |
| 6,953,291 B2 | 10/2005 | Liu | 2004/0108471 A1 | 6/2004 | Luo et al. |
| 6,954,515 B2 | 10/2005 | Bjorkholm et al. | 2004/0108473 A1 | 6/2004 | Melnychuk et al. |
| 6,965,284 B2 | 11/2005 | Maekawa et al. | 2004/0108823 A1 | 6/2004 | Amaldi et al. |
| 6,965,625 B2 | 11/2005 | Mross et al. | 2004/0136715 A1 | 7/2004 | Kondo |
| 6,972,439 B1 | 12/2005 | Kim et al. | 2004/0150991 A1 | 8/2004 | Ouderkirk et al. |
| 6,995,406 B2 | 2/2006 | Tojo et al. | 2004/0154925 A1 | 8/2004 | Podlaha et al. |
| 7,010,183 B2 | 3/2006 | Estes et al. | 2004/0171272 A1 | 9/2004 | Jin et al. |
| 7,064,500 B2 | 6/2006 | Victor et al. | 2004/0180244 A1 | 9/2004 | Tour et al. |
| 7,068,948 B2 | 6/2006 | Wei et al. | 2004/0184270 A1 | 9/2004 | Halter |
| 7,092,588 B2 | 8/2006 | Kondo | 2004/0213375 A1 | 10/2004 | Bjorkholm et al. |
| 7,092,603 B2 | 8/2006 | Glebov et al. | 2004/0217297 A1 | 11/2004 | Moses et al. |
| 7,099,586 B2 | 8/2006 | Yoo | 2004/0218651 A1 | 11/2004 | Iwasaki et al. |
| 7,120,332 B1 | 10/2006 | Spoonhower et al. | 2004/0231996 A1 | 11/2004 | Webb |
| 7,122,978 B2 | 10/2006 | Nakanishi et al. | 2004/0240035 A1 | 12/2004 | Zhilkov |
| 7,130,102 B2 | 10/2006 | Rabinowitz | 2004/0264867 A1 | 12/2004 | Kondo |
| 7,177,515 B2 | 2/2007 | Estes et al. | 2005/0023145 A1 | 2/2005 | Cohen et al. |
| 7,194,798 B2 | 3/2007 | Bonhote et al. | 2005/0045821 A1 | 3/2005 | Noji et al. |
| 7,230,201 B1 | 6/2007 | Miley et al. | 2005/0045832 A1 | 3/2005 | Kelly et al. |
| 7,253,426 B2 | 8/2007 | Gorrell et al. | 2005/0054151 A1 | 3/2005 | Lowther et al. |
| 7,267,459 B2 | 9/2007 | Matheson | 2005/0062903 A1 | 3/2005 | Cok et al. |
| 7,267,461 B2 | 9/2007 | Kan et al. | 2005/0067286 A1 | 3/2005 | Ahn et al. |
| 7,309,953 B2 | 12/2007 | Tiberi et al. | 2005/0082469 A1 | 4/2005 | Carlo |
| 7,342,441 B2 | 3/2008 | Gorrell et al. | 2005/0092929 A1 | 5/2005 | Schneiker |
| 7,359,589 B2 | 4/2008 | Gorrell et al. | 2005/0104684 A1 | 5/2005 | Wojcik |
| 7,361,916 B2 | 4/2008 | Gorrell et al. | 2005/0105595 A1 | 5/2005 | Martin et al. |
| 7,362,972 B2 | 4/2008 | Yavor et al. | 2005/0105690 A1 | 5/2005 | Pau et al. |
| 7,375,631 B2 | 5/2008 | Moskowitz et al. | 2005/0145882 A1 | 7/2005 | Taylor et al. |
| 7,436,177 B2 | 10/2008 | Gorrell et al. | 2005/0152635 A1 | 7/2005 | Paddon et al. |
| 7,442,940 B2 | 10/2008 | Gorrell et al. | 2005/0162104 A1 | 7/2005 | Victor et al. |
| 7,443,358 B2 | 10/2008 | Gorrell et al. | 2005/0180678 A1 | 8/2005 | Panepucci et al. |
| 7,459,099 B2 | 12/2008 | Kubena et al. | 2005/0190637 A1 | 9/2005 | Ichimura et al. |
| 7,470,920 B2 | 12/2008 | Gorrell et al. | 2005/0191055 A1 | 9/2005 | Maruyama et al. |
| 7,473,917 B2 | 1/2009 | Singh | 2005/0194258 A1 | 9/2005 | Cohen et al. |
| 7,554,083 B2 | 6/2009 | Gorrell et al. | 2005/0201707 A1 | 9/2005 | Glebov et al. |
| 7,569,836 B2 | 8/2009 | Gorrell | 2005/0201717 A1 | 9/2005 | Matsumura et al. |
| 7,573,045 B2 | 8/2009 | Gorrell et al. | 2005/0206314 A1 | 9/2005 | Habib et al. |
| 7,586,097 B2 | 9/2009 | Gorrell et al. | 2005/0212503 A1 | 9/2005 | Deibele |
| 7,586,167 B2 | 9/2009 | Gorrell et al. | 2005/0231138 A1 | 10/2005 | Nakanishi et al. |
| 2001/0002315 A1 | 5/2001 | Schultz et al. | 2005/0249451 A1 | 11/2005 | Baehr-Jones et al. |
| 2001/0025925 A1 | 10/2001 | Abe et al. | 2005/0285541 A1 | 12/2005 | LeChevalier |
| 2001/0045360 A1 | 11/2001 | Omasa | 2006/0007730 A1 | 1/2006 | Nakamura et al. |
| 2002/0009723 A1 | 1/2002 | Hefti | 2006/0018619 A1 | 1/2006 | Helffrich et al. |
| 2002/0027481 A1 | 3/2002 | Fiedziuszko | 2006/0035173 A1 | 2/2006 | Davidson et al. |
| 2002/0036121 A1 | 3/2002 | Ball et al. | 2006/0045418 A1 | 3/2006 | Cho et al. |
| 2002/0036264 A1 | 3/2002 | Nakasuji et al. | 2006/0050269 A1 | 3/2006 | Brownell |

| | | | |
|---|---|---|---|
| 2006/0060782 A1 | 3/2006 | Khursheed |
| 2006/0062258 A1 | 3/2006 | Brau et al. |
| 2006/0131176 A1 | 6/2006 | Hsu |
| 2006/0131695 A1 | 6/2006 | Kuekes et al. |
| 2006/0159131 A1 | 7/2006 | Liu et al. |
| 2006/0164496 A1 | 7/2006 | Tokutake et al. |
| 2006/0187794 A1 | 8/2006 | Harvey et al. |
| 2006/0208667 A1 | 9/2006 | Lys et al. |
| 2006/0216940 A1 | 9/2006 | Gorrell et al. |
| 2006/0232364 A1 | 10/2006 | Koh et al. |
| 2006/0243925 A1 | 11/2006 | Barker et al. |
| 2006/0274922 A1 | 12/2006 | Ragsdale |
| 2007/0003781 A1 | 1/2007 | de Rochemont |
| 2007/0013765 A1 | 1/2007 | Hudson et al. |
| 2007/0075263 A1 | 4/2007 | Gorrell et al. |
| 2007/0075264 A1 | 4/2007 | Gorrell et al. |
| 2007/0085039 A1 | 4/2007 | Gorrell et al. |
| 2007/0086915 A1 | 4/2007 | LeBoeuf et al. |
| 2007/0116420 A1 | 5/2007 | Estes et al. |
| 2007/0146704 A1 | 6/2007 | Schmidt et al. |
| 2007/0152176 A1 | 7/2007 | Gorrell et al. |
| 2007/0154846 A1 | 7/2007 | Gorrell et al. |
| 2007/0194357 A1 | 8/2007 | Oohashi et al. |
| 2007/0200940 A1 | 8/2007 | Gruhlke et al. |
| 2007/0238037 A1 | 10/2007 | Wuister et al. |
| 2007/0252983 A1 | 11/2007 | Tong et al. |
| 2007/0258492 A1 | 11/2007 | Gorrell |
| 2007/0258689 A1 | 11/2007 | Gorrell et al. |
| 2007/0258690 A1 | 11/2007 | Gorrell et al. |
| 2007/0258720 A1 | 11/2007 | Gorrell et al. |
| 2007/0259641 A1 | 11/2007 | Gorrell |
| 2007/0264023 A1 | 11/2007 | Gorrell et al. |
| 2007/0264030 A1 | 11/2007 | Gorrell et al. |
| 2007/0282030 A1 | 12/2007 | Anderson et al. |
| 2007/0284527 A1 | 12/2007 | Zani et al. |
| 2008/0069509 A1 | 3/2008 | Gorrell et al. |
| 2008/0218102 A1 | 9/2008 | Sliski et al. |
| 2008/0283501 A1 | 11/2008 | Roy |
| 2008/0302963 A1 | 12/2008 | Nakasuji et al. |

FOREIGN PATENT DOCUMENTS

| | | |
|---|---|---|
| JP | 2004-32323 A | 1/2004 |
| WO | WO 87/01873 | 3/1987 |
| WO | WO 93/21663 A1 | 10/1993 |
| WO | WO 00/72413 | 11/2000 |
| WO | WO 02/25785 | 3/2002 |
| WO | WO 02/077607 | 10/2002 |
| WO | WO 2004/086560 | 10/2004 |
| WO | WO 2005/015143 A2 | 2/2005 |
| WO | WO 2005/098966 | 10/2005 |
| WO | WO 2006/042239 A2 | 4/2006 |
| WO | WO 2007/081389 | 7/2007 |
| WO | WO 2007/081390 | 7/2007 |
| WO | WO 2007/081391 | 7/2007 |

OTHER PUBLICATIONS

Urata et al., "Superradiant Smith-Purcell Emission", Phys. Rev. Lett. 80, 516-519 (1998).*
Kapp, et al., "Modification of a scanning electron microscope to produce Smith-Purcell radiation", Rev. Sci. Instrum. 75, 4732 (2004).*
U.S. Appl. No. 11/418,082, filed May 5, 2006, Gorrell et al.
J. C. Palais, "Fiber optic communications," Prentice Hall, New Jersey, 1998, pp. 156-158.
Search Report and Written Opinion mailed Dec. 20, 2007 in PCT Appln. No. PCT/US2006/022771.
Search Report and Written Opinion mailed Jan. 31, 2008 in PCT Appln. No. PCT/US2006/027427.
Search Report and Written Opinion mailed Jan. 8, 2008 in PCT Appln. No. PCT/US2006/028741.
Search Report and Written Opinion mailed Mar. 11, 2008 in PCT Appln. No. PCT/US2006/022679.
Lee Kwang-Cheol et al., "Deep X-Ray Mask with Integrated Actuator for 3D Microfabrication", Conference: Pacific Rim Workshop on Transducers and Micro/Nano Technologies, (Xiamen CHN), Jul. 22, 2002.
Markoff, John, "A Chip That Can Transfer Data Using Laser Light," The New York Times, Sep. 18, 2006.
S.M. Sze, "Semiconductor Devices Physics and Technology", 2nd Edition, Chapters 9 and 12, Copyright 1985, 2002.
Search Report and Written Opinion mailed Feb. 12, 2007 in PCT Appln. No. PCT/US2006/022682.
Search Report and Written Opinion mailed Feb. 20, 2007 in PCT Appln. No. PCT/US2006/022676.
Search Report and Written Opinion mailed Feb. 20, 2007 in PCT Appln. No. PCT/US2006/022772.
Search Report and Written Opinion mailed Feb. 20, 2007 in PCT Appln. No. PCT/US2006/022780.
Search Report and Written Opinion mailed Feb. 21, 2007 in PCT Appln. No. PCT/US2006/022684.
Search Report and Written Opinion mailed Jan. 17, 2007 in PCT Appln. No. PCT/US2006/022777.
Search Report and Written Opinion mailed Jan. 23, 2007 in PCT Appln. No. PCT/US2006/022781.
Search Report and Written Opinion mailed Mar. 7, 2007 in PCT Appln. No. PCT/US2006/022775.
Speller et al., "A Low-Noise MEMS Accelerometer for Unattended Ground Sensor Applications", Applied MEMS Inc., 12200 Parc Crest, Stafford, TX, USA 77477.
Thurn-Albrecht et al., "Ultrahigh-Density Nanowire Arrays Grown in Self-Assembled Diblock Copolymer Templates", Science 290. 5499, Dec. 15, 2000, pp. 2126-2129.
"Array of Nanoklystrons for Frequency Agility or Redundancy," NASA's Jet Propulsion Laboratory, NASA Tech Briefs, NPO-21033. 2001.
"Hardware Development Programs," Calabazas Creek Research, Inc. found at http://calcreek.com/hardware.html.
"Antenna Arrays." May 18, 2002. www.tpub.com/content/neets/14183/css/14183_159.htm.
"Diffraction Grating," hyperphysics.phy-astr.gsu.edu/hbase/phyopt/grating.html.
Alford, T.L. et al., "Advanced silver-based metallization patterning for ULSI applications," Microelectronic Engineering 55, 2001, pp. 383-388, Elsevier Science B.V.
Amato, Ivan, "An Everyman's Free-Electron Laser?" Science, New Series, Oct. 16, 1992, p. 401, vol. 258 No. 5081, American Association for the Advancement of Science.
Andrews, H.L. et al., "Dispersion and Attenuation in a Smith-Purcell Free Electron Laser," The American Physical Society, Physical Review Special Topics—Accelerators and Beams 8 (2005), pp. 050703-1-050703-9.
Backe, H. et al. "Investigation of Far-Infrared Smith-Purcell Radiation at the 3.41 MeV Electron Injector Linac of the Mainz Microtron MAMI," Institut fur Kernphysik, Universitat Mainz, D-55099, Mainz Germany.
Bakhtyari, A. et al., "Horn Resonator Boosts Miniature Free-Electron Laser Power," Applied Physics Letters, May 12, 2003, pp. 3150-3152, vol. 82, No. 19, American Institute of Physics.
Bakhtyari, Dr. Arash, "Gain Mechanism in a Smith-Purcell MicroFEL," Abstract, Department of Physics and Astronomy, Dartmouth College.
Bhattacharjee, Sudeep et al., "Folded Waveguide Traveling-Wave Tube Sources for Terahertz Radiation." IEEE Transactions on Plasma Science, vol. 32. No. 3, Jun. 2004, pp. 1002-1014.
Booske, J.H. et al., "Microfabricated TWTs as High Power, Wideband Sources of THz Radiation".
Brau, C.A. et al., "Gain and Coherent Radiation from a Smith-Purcell Free Electron Laser," Proceedings of the 2004 FEL Conference, pp. 278-281.
Brownell, J.H. et al., "Improved µFEL Performance with Novel Resonator," Jan. 7, 2005, from website: www.frascati.enea.it/thz-bridge/workshop/presentations/Wednesday/We-07-Brownell.ppt.
Brownell, J.H. et al., "The Angular Distribution of the Power Produced by Smith-Purcell Radiation," J. Phys. D: Appl. Phys. 1997, pp. 2478-2481, vol. 30, IOP Publishing Ltd., United Kingdom.

Chuang, S.L. et al., "Enhancement of Smith-Purcell Radiation from a Grating with Surface-Plasmon Excitation," Journal of the Optical Society of America, Jun. 1984, pp. 672-676, vol. 1 No. 6, Optical Society of America.

Chuang, S.L. et al., "Smith-Purcell Radiation from a Charge Moving Above a Penetrable Grating," IEEE MTT-S Digest, 1983, pp. 405-406, IEEE.

Far-IR, Sub-MM & MM Detector Technology Workshop list of manuscripts, session 6 2002.

Feltz, W.F. et al., "Near-Continuous Profiling of Temperature, Moisture, and Atmospheric Stability Using the Atmospheric Emitted Radiance Interferometer (AERI)," Journal of Applied Meteorology, May 2003, vol. 42 No. 5, H.W. Wilson Company, pp. 584-597.

Freund, H.P. et al., "Linearized Field Theory of a Smith-Purcell Traveling Wave Tube," IEEE Transactions on Plasma Science, Jun. 2004, pp. 1015-1027, vol. 32 No. 3, IEEE.

Gallerano, G.P. et al., "Overview of Terahertz Radiation Sources," Proceedings of the 2004 FEL Conference, pp. 216-221.

Goldstein, M. et al., "Demonstration of a Micro Far-Infrared Smith-Purcell Emitter," Applied Physics Letters, Jul. 28, 1997, pp. 452-454, vol. 71 No. 4, American Institute of Physics.

Gover, A. et al., "Angular Radiation Pattern of Smith-Purcell Radiation," Journal of the Optical Society of America, Oct. 1984, pp. 723-728, vol. 1 No. 5, Optical Society of America.

Grishin, Yu. A. et al., "Pulsed Orotron—A New Microwave Source for Submillimeter Pulse High-Field Electron Paramagnetic Resonance Spectroscopy," Review of Scientific Instruments, Sep. 2004, pp. 2926-2936, vol. 75 No. 9, American Institute of Physics.

Ishizuka, H. et al., "Smith-Purcell Experiment Utilizing a Field-Emitter Array Cathode: Measurements of Radiation," Nuclear Instruments and Methods in Physics Research, 2001, pp. 593-598, A 475, Elsevier Science B.V.

Ishizuka, H. et al., "Smith-Purcell Radiation Experiment Using a Field-Emission Array Cathode," Nuclear Instruments and Methods in Physics Research, 2000, pp. 276-280, A 445, Elsevier Science B.V.

Ives, Lawrence et al., "Development of Backward Wave Oscillators for Terahertz Applications," Terahertz for Military and Security Applications, Proceedings of SPIE vol. 5070 (2003), pp. 71-82.

Ives, R. Lawrence, "IVEC Summary, Session 2, Sources I" 2002.

Jonietz, Erika, "Nano Antenna Gold nanospheres show path to all-optical computing," Technology Review, Dec. 2005/Jan. 2006, p. 32.

Joo, Youngcheol et al., "Air Cooling of IC Chip with Novel Microchannels Monolithically Formed on Chip Front Surface," Cooling and Thermal Design of Electronic Systems (HTD-vol. 319 & EEP-vol. 15), International Mechanical Engineering Congress and Exposition, San Francisco, CA Nov. 1995 PP. 117-121.

Joo, Youngcheol et al., "Fabrication of Monolithic Microchannels for IC Chip Cooling," 1995, Mechanical, Aerospace and Nuclear Engineering Department, University of California at Los Angeles.

Jung, K.B. et al., "Patterning of Cu, Co, Fe, and Ag for magnetic nanostructures," J. Vac. Sci. Technol. A 15(3), May/Jun. 1997, pp. 1780-1784.

Kapp, Oscar H. et al., "Modification of a Scanning Electron Microscope to Produce Smith-Purcell Radiation," Review of Scientific Instruments, Nov. 2004, pp. 4732-4741, vol. 75 No. 11, American Institute of Physics.

Kiener, C. et al., "Investigation of the Mean Free Path of Hot Electrons in GaAs/AlGaAs Heterostructures," Semicond. Sci. Technol., 1994, pp. 193-197, vol. 9, IOP Publishing Ltd., United Kingdom.

Kim, Shang Hoon, "Quantum Mechanical Theory of Free-Electron Two-Quantum Stark Emission Driven by Transverse Motion," Journal of the Physical Society of Japan, Aug. 1993, vol. 62 No. 8, pp. 2528-2532.

Korbly, S.E. et al., "Progress on a Smith-Purcell Radiation Bunch Length Diagnostic," Plasma Science and Fusion Center, MIT, Cambridge, MA.

Kormann, T. et al., "A Photoelectron Source for the Study of Smith-Purcell Radiation".

Kube, G. et al., "Observation of Optical Smith-Purcell Radiation at an Electron Beam Energy of 855 MeV," Physical Review E, May 8, 2002, vol. 65, The American Physical Society, pp. 056501-1-056501-15.

Liu, Chuan Sheng, et al., "Stimulated Coherent Smith-Purcell Radiation from a Metallic Grating," IEEE Journal of Quantum Electronics, Oct. 1999, pp. 1386-1389, vol. 35, No. 10, IEEE.

Manohara, Harish et al., "Field Emission Testing of Carbon Nanotubes for THz Frequency Vacuum Microtube Sources." Abstract. Dec. 2003. from SPIEWeb.

Manohara, Harish M. et al., "Design and Fabrication of a THz Nanoklystron".

Manohara, Harish M. et al., "Design and Fabrication of a THz Nanoklystron" (www.sofia.usra.edu/det_workshop/ posters/session 3/3-43manohara_poster.pdf), PowerPoint Presentation.

McDaniel, James C. et al., "Smith-Purcell Radiation in the High Conductivity and Plasma Frequency Limits," Applied Optics, Nov. 15, 1989, pp. 4924-4929, vol. 28 No. 22, Optical Society of America.

Meyer, Stephan, "Far IR, Sub-MM & MM Detector Technology Workshop Summary," Oct. 2002. (may date the Manohara documents).

Mokhoff, Nicolas, "Optical-speed light detector promises fast space talk," EETimes Online, Mar. 20, 2006, from website: www.eetimes.com/showArticle.jhtml?articleID=183701047.

Nguyen, Phucanh et al., "Novel technique to pattern silver using CF4 and CF4/O2 glow discharges," J.Vac. Sci. Technol. B 19(1), Jan./Feb. 2001, American Vacuum Society, pp. 158-165.

Nguyen, Phucanh et al., "Reactive ion etch of patterned and blanket silver thin films in Cl2/O2 and O2 glow discharges," J. Vac. Sci, Technol. B. 17 (5), Sep./Oct. 1999, American Vacuum Society, pp. 2204-2209.

Ohtaka, Kazuo, "Smith-Purcell Radiation from Metallic and Dielectric Photonic Crystals," Center for Frontier Science, pp. 272-273, Chiba University, 1-33 Yayoi, Inage-ku, Chiba-shi, Japan.

Phototonics Research, "Surface-Plasmon-Enhanced Random Laser Demonstrated," Phototonics Spectra, Feb. 2005, pp. 112-113.

Platt, C.L. et al., "A New Resonator Design for Smith-Purcell Free Electron Lasers," 6Q19, p. 296.

Potylitsin, A.P., "Resonant Diffraction Radiation and Smith-Purcell Effect," (Abstract), arXiv: physics/9803043 v2 Apr. 13, 1998.

Potylitsyn, A.P., "Resonant Diffraction Radiation and Smith-Purcell Effect," Physics Letters A, Feb. 2, 1998, pp. 112-116, A 238, Elsevier Science B.V.

S. Hoogland et al., "A solution-processed 1.53 µm quantum dot laser with temperature-invariant emission wavelength," Optics Express, vol. 14, No. 8, Apr. 17, 2006, pp. 3273-3281.

Savilov, Andrey V., "Stimulated Wave Scattering in the Smith-Purcell FEL," IEEE Transactions on Plasma Science, Oct. 2001, pp. 820-823, vol. 29 No. 5, IEEE.

Schachter, Levi et al., "Smith-Purcell Oscillator in an Exponential Gain Regime," Journal of Applied Physics, Apr. 15, 1989, pp. 3267-3269, vol. 65 No. 8, American Institute of Physics.

Schachter, Levi, "Influence of the Guiding Magnetic Field on the Performance of a Smith-Purcell Amplifier Operating in the Weak Compton Regime," Journal of the Optical Society of America, May 1990, pp. 873-876, vol. 7 No. 5, Optical Society of America.

Schachter, Levi, "The Influence of the Guided Magnetic Field on the Performance of a Smith-Purcell Amplifier Operating in the Strong Compton Regime," Journal of Applied Physics, Apr. 15, 1990, pp. 3582-3592, vol. 67 No. 8, American Institute of Physics.

Shih, I. et al., "Experimental Investigations of Smith-Purcell Radiation," Journal of the Optical Society of America, Mar. 1990, pp. 351-356, vol. 7, No. 3, Optical Society of America.

Shih, I. et al., "Measurements of Smith-Purcell Radiation," Journal of the Optical Society of America, Mar. 1990, pp. 345-350, vol. 7 No. 3, Optical Society of America.

Swartz, J.C. et al., "THz-FIR Grating Coupled Radiation Source," Plasma Science, 1998. 1D02, p. 126.

Temkin, Richard, "Scanning with Ease Through the Far Infrared," Science, New Series, May 8, 1998, p. 854, vol. 280, No. 5365, American Association for the Advancement of Science.

Walsh, J.E., et al., 1999. From website: http://www.ieee.org/organizations/pubs/newsletters/leos/feb99/hot2.htm.

Wentworth, Stuart M. et al., "Far-Infrared Composite Microbolometers," IEEE MTT-S Digest, 1990, pp. 1309-1310.

Yamamoto, N. et al., "Photon Emission From Silver Particles Induced by a High-Energy Electron Beam," Physical Review B, Nov. 6, 2001, pp. 205419-1-205419-9, vol. 64, The American Physical Society.

Yokoo, K. et al., "Smith-Purcell Radiation at Optical Wavelength Using a Field-Emitter Array," Technical Digest of IVMC, 2003, pp. 77-78.

Zeng, Yuxiao et al., "Processing and encapsulation of silver patterns by using reactive ion etch and ammonia anneal," Materials Chemistry and Physics 66, 2000, pp. 77-82.

Search Report and Written Opinion mailed Aug. 24, 2007 in PCT Appln. No. PCT/US2006/022768.

Search Report and Written Opinion mailed Aug. 31, 2007 in PCT Appln. No. PCT/US2006/022680.

Search Report and Written Opinion mailed Jul. 16, 2007 in PCT Appln. No. PCT/US2006/022774.

Search Report and Written Opinion mailed Jul. 20, 2007 in PCT Appln. No. PCT/US2006/024216.

Search Report and Written Opinion mailed Jul. 26, 2007 in PCT Appln. No. PCT/US2006/022776.

Search Report and Written Opinion mailed Jun. 20, 2007 in PCT Appln. No. PCT/US2006/022779.

Search Report and Written Opinion mailed Sep. 12, 2007 in PCT Appln. No. PCT/US2006/022767.

Search Report and Written Opinion mailed Sep. 13, 2007 in PCT Appln. No. PCT/US2006/024217.

Search Report and Written Opinion mailed Sep. 17, 2007 in PCT Appln. No. PCT/US2006/022787.

Search Report and Written Opinion mailed Sep. 5, 2007 in PCT Appln. No. PCT/US2006/027428.

Search Report and Written Opinion mailed Sep. 17, 2007 in PCT Appln. No. PCT/US2006/022689.

International Search Report and Written Opinion mailed November 23, 2007 in International Application No. PCT/US2006/022786.

Search Report and Written Opinion mailed Oct. 25, 2007 in PCT Appln. No. PCT/US2006/022687.

Search Report and Written Opinion mailed Oct. 26, 2007 in PCT Appln. No. PCT/US2006/022675.

Search Report and Written Opinion mailed Sep. 21, 2007 in PCT Appln. No. PCT/US2006/022688.

Search Report and Written Opinion mailed Sep. 25, 2007 in PCT appln. No. PCT/US2006/022681.

Search Report and Written Opinion mailed Sep. 26, 2007 in PCT Appln. No. PCT/US2006/024218.

Search Report and Written Opinion mailed Apr. 23, 2008 in PCT Appln. No. PCT/US2006/022678.

Search Report and Written Opinion mailed Apr. 3, 2008 in PCT Appln. No. PCT/US2006/027429.

Search Report and Written Opinion mailed Jun. 18, 2008 in PCT Appln. No. PCT/US2006/027430.

Search Report and Written Opinion mailed Jun. 3, 2008 in PCT Appln. No. PCT/US2006/022783.

Search Report and Written Opinion mailed Mar. 24, 2008 in PCT Appln. No. PCT/US2006/022677.

Search Report and Written Opinion mailed Mar. 24, 2008 in PCT Appln. No. PCT/US2006/022784.

Search Report and Written Opinion mailed May 2, 2008 in PCT Appln. No. PCT/US2006/023280.

Search Report and Written Opinion mailed May 21, 2008 in PCT Appln. No. PCT/US2006/023279.

Search Report and Written Opinion mailed May 22, 2008 in PCT Appln. No. PCT/US2006/022685.

Neo et al., "Smith-Purcell Radiation from Ultraviolet to Infrared Using a Si-field Emitter" Vacuum Electronics Conference, 2007, IVEC '07, IEEE International May 2007.

Search Report and Writen Opinion mailed Jul. 14, 2008 in PCT Appln. No. PCT/US2006/022773.

Search Report and Written Opinion mailed Aug. 19, 2008 in PCT Appln. No. PCT/US2007/008363.

Search Report and Written Opinion mailed Jul. 16, 2008 in PCT Appln. No. PCT/US2006/022766.

Search Report and Written Opinion mailed Jul. 28, 2008 in PCT Appln. No. PCT/US2006/022782.

Search Report and Written Opinion mailed Jul. 3, 2008 in PCT Appln. No. PCT/US2006/022690.

Search Report and Written Opinion mailed Jul. 3, 2008 in PCT Appln. No. PCT/US2006/022778.

Search Report and Written Opinion mailed Jul. 7, 2008 in PCT Appln. No. PCT/US2006/022686.

Search Report and Written Opinion mailed Jul. 7, 2008 in PCT Appln. No. PCT/US2006/022785.

Search Report and Written Opinion mailed Sep. 2, 2008 in PCT Appln. No. PCT/US2006/022769.

Search Report and Written Opinion mailed Sep. 26, 2008 in PCT Appln. No. PCT/US2007/00053.

Search Report and Written Opinion mailed Sep. 3, 2008 in PCT Appln. No. PCT/US2006/022770.

"An Early History—Invention of the Klystron," http://varianinc.com/cgi-bin/advprint/print.cgi?cid=KLQNPPJJFJ, printed on Dec. 26, 2008.

"An Early History—The Founding of Varian Associates," http://varianinc.com/cgi-bin/advprint/print.cgi?cid=KLQNPPJJFJ, printed on Dec. 26, 2008.

"Chapter 3 X-Ray Tube," http://compepid.tuskegee.edu/syllabi/clinical/small/radiology/chapter..., printed from tuskegee.edu on Dec. 29, 2008.

"Diagnostic imaging modalities—Ionizing vs non-ionizing radiation," http://info.med.yale.edu/intmed/cardio/imaging/techniques/ionizing_v..., printed from Yale University School of Medicine on Dec. 29, 2008.

"Frequently Asked Questions," Luxtera Inc., found at http://www.luxtera.com/technology_faq.htm, printed on Dec. 2, 2005, 4 pages.

"Klystron Amplifier," http://www.radartutorial.eu/08.transmitters/tx12.en.html, printed on Dec. 26, 2008.

"Klystron is a Micowave Generator," http://www2.slac.stanford.edu/vvc/accelerators/klystron.html, printed on Dec. 26, 2008.

"Klystron," http:en.wikipedia.org/wiki/Klystron, printed on Dec. 26, 2008.

"Making X-rays," http://www.fnrfscience.cmu.ac.th/theory/radiation/xray-basics.html, printed on Dec. 29, 2008.

"Microwave Tubes," http://www.tpub.com/neets/book11/45b.htm, printed on Dec. 26, 2008.

"Notice of Allowability" mailed on Jan. 17, 2008 in U.S. Appl. No. 11/418,082, filed May 5, 2006.

"Notice of Allowability" mailed on Jul. 2, 2009 in U.S. Appl. No. 11/410,905, filed Apr. 26, 2006.

"Notice of Allowability" mailed on Jun. 30, 2009 in U.S. Appl. No. 11/418,084, filed May 5, 2006.

"Technology Overview," Luxtera, Inc., found at http://www.luxtera.com/technology.htm, printed on Dec. 2, 2005, 1 page.

"The Reflex Klystron," http://www.fnrfscience.cmu.ac.th/theory/microwave/microwave%2, printed from Fast Netoron Research Facilty on Dec. 26, 2008.

"X-ray tube," http://www.answers.com/topic/x-ray-tube, printed on Dec. 29, 2008.

Mar. 24, 2006 PTO Office Action in U.S. Appl. No. 10/917,511.

Mar. 25, 2008 PTO Office Action in U.S. Appl. No. 11/411,131.

Apr. 8, 2008 PTO Office Action in U.S. Appl. No. 11/325,571.

Apr. 17, 2008 Response to PTO Office Action of Dec. 20, 2007 in U.S. Appl. No. 11/418,087.

Apr. 19, 2007 Response to PTO Office Action of Jan. 17, 2007 in U.S. Appl. No. 11/418,082.

May 10, 2005 PTO Office Action in U.S. Appl. No. 10/917,511.

May 21, 2007 PTO Office Action in U.S. Appl. No. 11/418,087.

May 26, 2006 Response to PTO Office Action of Mar. 24, 2006 in U.S. Appl. No. 10/917,511.

Jun. 16, 2008 Response to PTO Office Action of Dec. 14, 2007 in U.S. Appl. No. 11/418,264.

Jun. 20, 2008 Response to PTO Office Action of Mar. 25, 2008 in U.S. Appl. No. 11/411,131.

Aug. 14, 2006 PTO Office Action in U.S. Appl. No. 10/917,511.

Sep. 1, 2006 Response to PTO Office Action of Aug. 14, 2006 in U.S. Appl. No. 10/917,511.

Sep. 12, 2005 Response to PTO Office Action of May 10, 2005 in U.S. Appl. No. 10/917,511.

Sep. 14, 2007 PTO Office Action in U.S. Appl. No. 11/411,131.

Oct. 19, 2007 Response to PTO Office Action of May 21, 2007 in U.S. Appl. No. 11/418,087.
Dec. 4, 2006 PTO Office Action in U.S. Appl. No. 11/418,087.
Dec. 14, 2007 PTO Office Action in U.S. Appl. No. 11/418,264.
Dec. 14, 2007 Response to PTO Office Action of Sep. 14, 2007 in U.S. Appl. No. 11/411,131.
Dec. 20, 2007 PTO Office Action in U.S. Appl. No. 11/418,087.
B. B Loechel et al., "Fabrication of Magnetic Microstructures by Using Thick Layer Resists", Microelectronics Eng., vol. 21, pp. 463-466 (1993).
Corcoran, Elizabeth, "Ride the Light," Forbes Magazine, Apr. 11, 2005, pp. 68-70.
European Search Report mailed Mar. 3, 2009 in European Application No. 06852028.7.
Magellan 8500 Scanner Product Reference Guide, PSC Inc., 2004, pp. 6-27—F18.
Magellan 9500 with SmartSentry Quick Reference Guide, PSC Inc., 2004.
Ossia, Babak, "The X-Ray Production," Department of Biomedical Engineering—University of Rhode Island, 1 page.
Response to Non-Final Office Action submitted May 13, 2009 in U.S. Appl. No. 11/203,407.
Sadwick, Larry et al., "Microfabricated next-generation millimeter-wave power amplifiers," www.rfdesign.com, Dated Jul. 2009.
Saraph, Girish P. et al., "Design of a Single-Stage Depressed Collector for High-Power, Pulsed Gyroklystrom Amplifiers," IEEE Transactions on Electron Devices, vol. 45, No. 4, Apr. 1998, pp. 986-990.
Sartori, Gabriele, "CMOS Photonics Platform," Luxtera, Inc., Nov. 2005, 19 pages.
Scherer et al. "Photonic Crystals for Confining, Guiding, and Emitting Light", IEEE Transactions on Nanotechnology, vol. 1, No. 1, Mar. 2002, pp. 4-11.
Thumm, Manfred, "Historical German Contributions on Physics and Applications of Electromagnetic Oscillations and Waves," Dated Jul. 2009.
U.S. Appl. No. 11/203,407, filed Nov. 13, 2008 PTO Office Action.
U.S. Appl. No. 11/203,407, filed Jul. 17, 2009 PTO Office Action.
U.S. Appl. No. 11/238,991, filed Dec. 6, 2006 PTO Office Action.
U.S. Appl. No. 11/238,991, filed Jun. 6, 2007 Response to PTO Office Action of Dec. 6, 2006.
U.S. Appl. No. 11/238,991, filed Sep. 10, 2007 PTO Office Action.
U.S. Appl. No. 11/238,991, filed Mar. 6, 2008 Response to PTO Office Action of Sep. 10, 2007.
U.S. Appl. No. 11/238,991, filed Jun. 27, 2008 PTO Office Action.
U.S. Appl. No. 11/238,991, filed Dec. 29, 2009 Response to PTO Office Action of Jun. 27, 2008.
U.S. Appl. No. 11/238,991, filed Mar. 24, 2009 PTO Office Action.
U.S. Appl. No. 11/238,991, filed May 11, 2009 PTO Office Action.
U.S. Appl. No. 11/243,477, filed Apr. 25, 2008 PTO Office Action.
U.S. Appl. No. 11/243,477, filed Oct. 24, 2008 Response to PTO Office Action of Apr. 25, 2008.
U.S. Appl. No. 11/243,477, filed Jan. 7, 2009 PTO Office Action.
U.S. Appl. No. 11/325,448, filed Jun. 16, 2008 PTO Office Action.
U.S. Appl. No. 11/325,448, filed Dec. 16, 2008 Response to PTO Office Action of Jun. 16, 2008.
U.S. Appl. No. 11/325,534, filed Jun. 11, 2008 PTO Office Action.
U.S. Appl. No. 11/325,534, filed Oct. 15, 2008 Response to PTO Office Action of Jun. 11, 2008.
U.S. Appl. No. 11/350,812, filed Apr. 17, 2009 Office Action.
U.S. Appl. No. 11/353,208, filed Jan. 15, 2008 PTO Office Action.
U.S. Appl. No. 11/353,208, filed Mar. 17, 2008 PTO Office Action.
U.S. Appl. No. 11/353,208, filed Sep. 15, 2008 Response to PTO Office Action of Mar. 17, 2008.
U.S. Appl. No. 11/353,208, filed Dec. 24, 2008 PTO Office Action.
U.S. Appl. No. 11/353,208, filed Dec. 30, 2008 Response to PTO Office Action of Dec. 24, 2008.
U.S. Appl. No. 11/400,280, filed Oct. 16, 2008 PTO Office Action.
U.S. Appl. No. 11/400,280, filed Oct. 24, 2008 Response to PTO Office Action of Oct. 16, 2008.
U.S. Appl. No. 11/410,905, filed Sep. 26, 2008 PTO Office Action.
U.S. Appl. No. 11/410,905, filed Mar. 26, 2009 Response to PTO Office Action of Sep. 26, 2008.
U.S. Appl. No. 11/410,924, filed Mar. 6, 2009 PTO Office Action.
U.S. Appl. No. 11/411,120, filed Mar. 19, 2009 PTO Office Action.
U.S. Appl. No. 11/411,129, filed Jan. 16, 2009 Office Action.
U.S. Appl. No. 11/411,130, filed May 1, 2008 PTO Office Action.
U.S. Appl. No. 11/411,130, filed Oct. 29, 2008 Response to PTO Office Action of May 1, 2008.
U.S. Appl. No. 11/411,130, filed Jun. 23, 2009 PTO Office Action.
U.S. Appl. No. 11/417,129, filed Jul. 11, 2007 PTO Office Action.
U.S. Appl. No. 11/417,129, filed Dec. 17, 2007 Response to PTO Office Action of Jul. 11, 2007.
U.S. Appl. No. 11/417,129, filed Dec. 20, 2007 Response to PTO Office Action of Jul. 11, 2007.
U.S. Appl. No. 11/417,129, filed Apr. 17, 2008 PTO Office Action.
U.S. Appl. No. 11/417,129, filed Jun. 19, 2008 Response to PTO Office Action of Apr. 17, 2008.
U.S. Appl. No. 11/418,079, filed Apr. 11, 2008 PTO Office Action.
U.S. Appl. No. 11/418,079, filed Oct. 7, 2008 Response to PTO Office Action of Apr. 11, 2008.
U.S. Appl. No. 11/418,079, filed Feb. 12, 2009 PTO Office Action.
U.S. Appl. No. 11/418,080, filed Mar. 18, 2009 PTO Office Action.
U.S. Appl. No. 11/418,082, filed Jan. 17, 2007 PTO Office Action.
U.S. Appl. No. 11/418,083, filed Jun. 20, 2008 PTO Office Action.
U.S. Appl. No. 11/418,083, filed Dec. 18, 2008 Response to PTO Office Action of Jun. 20, 2008.
U.S. Appl. No. 11/418,084, filed Nov. 5, 2007 PTO Office Action.
U.S. Appl. No. 11/418,084, filed May 5, 2008 Response to PTO Office Action of Nov. 5, 2007.
U.S. Appl. No. 11/418,084, filed Aug. 19, 2008 PTO Office Action.
U.S. Appl. No. 11/418,084, filed Feb. 19, 2009 Response to PTO Office Action of Aug. 19, 2008.
U.S. Appl. No. 11/418,085, filed Aug. 10, 2007 PTO Office Action.
U.S. Appl. No. 11/418,085, filed Nov. 13, 2007 Response to PTO Office Action of Aug. 10, 2007.
U.S. Appl. No. 11/418,085, filed Feb. 12, 2008 PTO Office Action.
U.S. Appl. No. 11/418,085, filed Aug. 12, 2008 Response to PTO Office Action of Feb. 12, 2008.
U.S. Appl. No. 11/418,085, filed Sep. 16, 2008 PTO Office Action.
U.S. Appl. No. 11/418,085, filed Mar. 6, 2009 Response to PTO Office Action of Sep. 16, 2008.
U.S. Appl. No. 11/418,087, filed Dec. 29, 2006 Response to PTO Office Action of Dec. 4, 2006.
U.S. Appl. No. 11/418,087, filed Feb. 15, 2007 PTO Office Action.
U.S. Appl. No. 11/418,087, filed Mar. 6, 2007 Response to PTO Office Action of Feb. 15, 2007.
U.S. Appl. No. 11/418,088, filed Jun. 9, 2008 PTO Office Action.
U.S. Appl. No. 11/418,088, filed Dec. 8, 2008 Response to PTO Office Action of Jun. 9, 2008.
U.S. Appl. No. 11/418,089, filed Mar. 21, 2008 PTO Office Action.
U.S. Appl. No. 11/418,089, filed Jun. 23, 2008 Response to PTO Office Action of Mar. 21, 2008.
U.S. Appl. No. 11/418,089, filed Sep. 30, 2008 PTO Office Action.
U.S. Appl. No. 11/418,089, filed Mar. 30, 2009 Response to PTO Office Action of Sep. 30, 2008.
U.S. Appl. No. 11/418,089, filed Jul. 15, 2009 PTO Office Action.
U.S. Appl. No. 11/418,091, filed Jul. 30, 2007 PTO Office Action.
U.S. Appl. No. 11/418,091, filed Nov. 27, 2007 Response to PTO Office Action of Jul. 30, 2007.
U.S. Appl. No. 11/418,091, filed Feb. 26, 2008 PTO Office Action.
U.S. Appl. No. 11/418,096, filed Jun. 23, 2009 PTO Office Action.
U.S. Appl. No. 11/418,097, filed Jun. 2, 2008 PTO Office Action.
U.S. Appl. No. 11/418,097, filed Dec. 2, 2008 Response to PTO Office Action of Jun. 2, 2008.
U.S. Appl. No. 11/418,097, filed Feb. 18, 2009 PTO Office Action.
U.S. Appl. No. 11/418,099, filed Jun. 23, 2008 PTO Office Action.
U.S. Appl. No. 11/418,099, filed Dec. 23, 2008 Response to PTO Office Action of Jun. 23, 2008.
U.S. Appl. No. 11/418,100, filed Jan. 12, 2009 PTO Office Action.
U.S. Appl. No. 11/418,124, filed Oct. 1, 2008 PTO Office Action.
U.S. Appl. No. 11/418,124, filed Feb. 2, 2009 Response to PTO Office Action of Oct. 1, 2008.
U.S. Appl. No. 11/418,124, filed Mar. 13, 2009 PTO Office Action.
U.S. Appl. No. 11/418,126, filed Oct. 12, 2006 PTO Office Action.
U.S. Appl. No. 11/418,126, filed Feb. 12, 2007 Response to PTO Office Action of Oct. 12, 2006 (Redacted).

U.S. Appl. No. 11/418,126, filed Jun. 6, 2007 PTO Office Action.
U.S. Appl. No. 11/418,126, filed Aug. 6, 2007 Response to PTO Office Action of Jun. 6, 2007.
U.S. Appl. No. 11/418,126, filed Nov. 2, 2007 PTO Office Action.
U.S. Appl. No. 11/418,126, filed Feb. 22, 2008 Response to PTO Office Action of Nov. 2, 2007.
U.S. Appl. No. 11/418,126, filed Jun. 10, 2008 PTO Office Action.
U.S. Appl. No. 11/418,127, filed Apr. 2, 2009 Office Action.
U.S. Appl. No. 11/418,128, filed Dec. 16, 2008 PTO Office Action.
U.S. Appl. No. 11/418,128, filed Dec. 31, 2008 Response to PTO Office Action of Dec. 16, 2008.
U.S. Appl. No. 11/418,128, filed Feb. 17, 2009 PTO Office Action.
U.S. Appl. No. 11/418,129, filed Dec. 16, 2008 Office Action.
U.S. Appl. No. 11/418,129, filed Dec. 31, 2008 Response to PTO Office Action of Dec. 16, 2008.
U.S. Appl. No. 11/418,244, filed Jul. 1, 2008 PTO Office Action.
U.S. Appl. No. 11/418,244, filed Nov. 25, 2008 Response to PTO Office Action of Jul. 1, 2008.
U.S. Appl. No. 11/418,263, filed Sep. 24, 2008 PTO Office Action.
U.S. Appl. No. 11/418,263, filed Dec. 24, 2008 Response to PTO Office Action of Sep. 24, 2008.
U.S. Appl. No. 11/418,263, filed Mar. 9, 2009 PTO Office Action.
U.S. Appl. No. 11/418,315, filed Mar. 31, 2008 PTO Office Action.
U.S. Appl. No. 11/418,318, filed Mar. 31, 2009 PTO Office Action.
U.S. Appl. No. 11/418,365, filed Jul. 23, 2009 PTO Office Action.
U.S. Appl. No. 11/433,486, filed Jun. 19, 2009 PTO Office Action.
U.S. Appl. No. 11/441,219, filed Jan. 7, 2009 PTO Office Action.
U.S. Appl. No. 11/522,929, filed Oct. 22, 2007 PTO Office Action.
U.S. Appl. No. 11/522,929, filed Feb. 21, 2008 Response to PTO Office Action of Oct. 22, 2007.
U.S. Appl. No. 11/641,678, filed Jul. 22, 2008 PTO Office Action.
U.S. Appl. No. 11/641,678, filed Jan. 22, 2009 Response to Office Action of Jul. 22, 2008.
U.S. Appl. No. 11/711,000, filed Mar. 6, 2009 PTO Office Action.
U.S. Appl. No. 11/716,552, filed Jul. 3, 2008 PTO Office Action.
U.S. Appl. No. 11/716,552, filed Feb. 12, 2009 Response to PTO Office Action of Feb. 9, 2009.
Whiteside, Andy et al., "Dramatic Power Saving using Depressed Collector IOT Transmitters in Digital and Analog Service," dated Jul. 2009.
Bekefi et al., "Stimulated Raman Scattering by an Intense Relativistic Electron Beam Subjected to a Rippled Electron Field", Aug. 1979, J. Appl. Phys., 50(8), 5168-5164.
European Search Report mailed Nov. 2, 2009 (related to PCT/US2006/022782).
Gervasoni J.L. et al., "Plasmon Excitations in Cylindrical Wires by External Charged Particles," Physical Review B (Condensed Matter and Materials Physics) APS through AIP USA, vol. 68, No. 23, Dec. 15, 2003, pp. 235302-1, XP002548423, ISSN: 0163-1829.
Gervasoni, J.L., "Excitations of Bulk and Surface Plasmons in Solids and Nanostructures," Surface and Interface Analysis, Apr. 2006, John Wiley and Sons LTD GB, vol. 38, No. 4, Apr. 2006, pp. 583-586, XP002548422.
U.S. Appl. No. 11/411,129, filed Jan. 28, 2010 PTO Office Action.
U.S. Appl. No. 11/418,079, filed Jan. 7, 2010 PTO Office Action.
U.S. Appl. No. 11/418,080, filed Jan. 5, 2010 PTO Office Action.
U.S. Appl. No. 11/418,097, filed Sep. 16, 2009 PTO Office Action.
U.S. Appl. No. 11/418,128, filed Nov. 24, 2009 PTO Office Action.
U.S. Appl. No. 11/418,263, filed Dec. 9, 2009 PTO Office Action.
U.S. Appl. No. 11/441,240, filed Aug. 31, 2009 PTO Office Action.

* cited by examiner

COUPLED NANO-RESONATING ENERGY EMITTING STRUCTURES

CROSS-REFERENCE TO CO-PENDING APPLICATIONS

The present invention is related to the following co-pending U.S. patent applications: (1) U.S. patent application Ser. No. 11/238,991, filed Sep. 30, 2005, entitled "Ultra-Small Resonating Charged Particle Beam Modulator"; (2) U.S. patent application Ser. No. 10/917,511, filed on Aug. 13, 2004, entitled "Patterning Thin Metal Film by Dry Reactive Ion Etching"; (3) U.S. application Ser. No. 11/203,407, filed on Aug. 15, 2005, entitled "Method Of Patterning Ultra-Small Structures"; (4) U.S. application Ser. No. 11/243,476, filed on Oct. 5, 2005, entitled "Structures And Methods For Coupling Energy From An Electromagnetic Wave"; (5) U.S. application Ser. No. 11/243,477, filed on Oct. 5, 2005, entitled "Electron beam induced resonance,", (6) U.S. application Ser. No. 11/325,432, entitled "Resonant Structure-Based Display," filed on Jan. 5, 2006; (7) U.S. application Ser. No. 11/325,571, entitled "Switching Micro-Resonant Structures By Modulating A Beam Of Charged Particles," filed on Jan. 5, 2006; (8) U.S. application Ser. No. 11/325,534, entitled "Switching Micro-Resonant Structures Using At Least One Director," filed on Jan. 5, 2006; (9) U.S. application Ser. No. 11/350,812, entitled "Conductive Polymers for the Electroplating", filed on Feb. 10, 2006; (10) U.S. application Ser. No. 11/302,471, entitled "Coupled Nano-Resonating Energy Emitting Structures," filed on Dec. 14, 2005; and (11) U.S. application Ser. No. 11/325,448, entitled "Selectable Frequency Light Emitter", filed on Jan. 5, 2006, which are all commonly owned with the present application, the entire contents of each of which are incorporated herein by reference.

COPYRIGHT NOTICE

A portion of the disclosure of this patent document contains material which is subject to copyright or mask work protection. The copyright or mask work owner has no objection to the facsimile reproduction by anyone of the patent document or the patent disclosure, as it appears in the Patent and Trademark Office patent file or records, but otherwise reserves all copyright or mask work rights whatsoever.

Field of the Disclosure

This disclosure relates to electromagnetic radiation devices, and particularly to ultra-small resonant structures.

Introduction

A multitude of applications exist for electromagnetic radiating devices. A few such devices emit radiation at frequencies spanning the infrared, visible, and ultra-violet spectrums. A subgroup (being the majority) of such devices are constructed using semiconductor-based technologies (light emitting diodes and the like), and are considered small (on the order of millimeters in dimension).

The devices of the present invention produce electromagnetic radiation (EMR) by the excitation of ultra-small resonant structures. The resonant excitation in a device according to the invention is induced by electromagnetic interaction which is caused, e.g., by the passing of a charged particle beam in close proximity to the device. The charged particle beam can include ions (positive or negative), electrons, protons and the like. The beam may be produced by any source, including, e.g., without limitation an ion gun, a tungsten filament, a cathode, a planar vacuum triode, an electron-impact ionizer, a laser ionizer, a chemical ionizer, a thermal ionizer, an ion-impact ionizer. While many of the above referenced applications disclose and cover arrays of the ultra-small resonant structures that extend horizontally, it is also possible to employ a charged particle beam, or an electron beam, that is generated from an integral field emission tip formed on the surface of a substrate and to then form an array of ultra-small resonant structures vertically so that the system would operate in a vertical manner.

Glossary

As used throughout this document:

The phrase "ultra-small resonant structure" shall mean any structure of any material, type or microscopic size that by its characteristics causes electrons to resonate at a frequency in excess of the microwave frequency.

The term "ultra-small" within the phrase "ultra-small resonant structure" shall mean microscopic structural dimensions and shall include so-called "micro" structures, "nano" structures, or any other very small structures that will produce resonance at frequencies in excess of microwave frequencies.

DESCRIPTION OF PRESENTLY PREFERRED EXAMPLES OF THE INVENTION

Brief Description Of Figures

The invention is better understood by reading the following detailed description with reference to the accompanying drawings in which.

DESCRIPTION

Figure 1A:
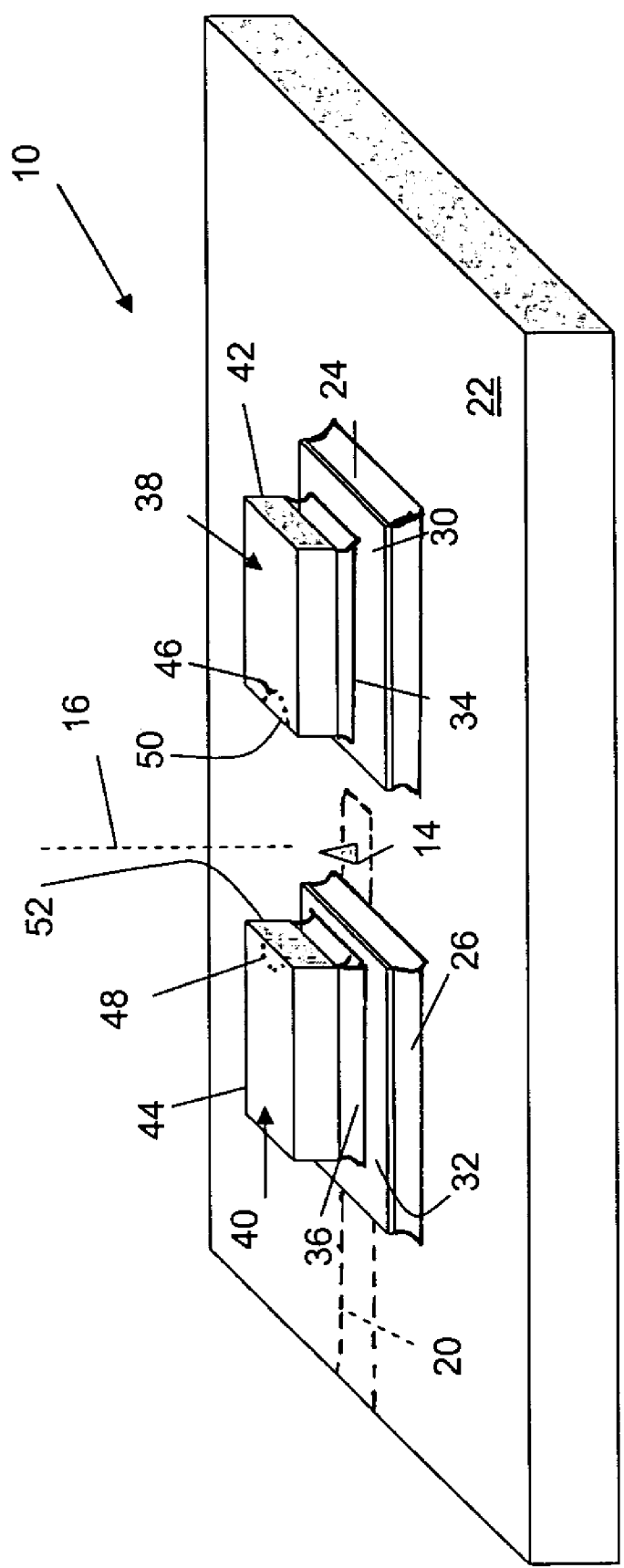
FIG. 1A is a schematic view of a nano-resonating energy emitting structure according to an embodiment of the present invention.

As shown in FIG. 1A, a nano-resonating electromagnetic radiation emitting structure 10, according to embodiments of the present invention, includes an integral source 14 of charged particles, such as a field emission tip, that can be formed on a portion of a conductive region 20 of a substrate 22. The conductive region 20 permits the desired connection to the field emission tip 14 and allows tip 14 to be energized to produce a beam of charged particles 16. The charged particles of beam 16 may consist of electrons, protons or ions. The conductive region can, for example, be comprised of a dopant, for example, phosphorus. The conductive region 20 can be energized by applying a voltage of 100 volts or less, but it is preferred to keep the voltage as low as possible while still emitting an ample volume of charged particles, while still providing enough energy to resonate the structures effectively.

The structure 10 can include, for example, a substrate 22 bearing the conductive region 20 and the field emission tip 14 as well as opposing anodes 30 and 32 formed on layers 24 and 26 that comprise a layer of a suitable dielectric material or insulating material and which separate the anodes 30 and 32 from substrate 22. Opposing, separated ultra-small structures 38 and 40 are formed so as to be spaced above the anodes 30 and 32 with dielectric or insulating material 34 and 36 being provided there below to separate the ultra-small structures 38 and 40 from anodes 30 and 32. Substrate 22 can be comprised of conductive, semi conductive or non-conductive material including, for example, silicon or, GaAs.

Each of the ultra-small structures 38 and 40 include an outer structure 42, and 44, and can have, as well, an inner cavity shown in phantom at 46 and 48 formed on an inner face 50 and 52, respectively. This structure permits the ultra-small resonant structures 38 and 40 to resonate as the beam 16 passes vertically by cavities 46 and 48. These ultra-small structures 38 and 40 can have a variety of cross-sectional and external shapes, as well as a variety of internal or cavity shapes, including squares, semi-circles, C-shaped structures, or oval structures. This list is not to be taken as limiting the disclosure but only as being suggestive and exemplary of the shape of the ultra-small resonant structures included herein. The cavity can occupy a small portion of the total area of the structure or a major portion of that area. Further, depending on the overall shape of the ultra-small nano-resonant structures, there may not be a need for any internal cavity.

The field emission tip 14 can be preferably positioned on the conductive material 20 so as to be under and within the opening existing between the ultra-small structures 38 and 40 and so that beam 16 will pass there between and energize each of the ultra-small structures 38 and 40 to generate and transmit energy radiation outside of the ultra-small structures 38 and 40.

The charged particle beam 16 can include ions (positive or negative), electrons, protons and the like. Many well-known means and methods exist to produce a charged particle beam, including the use of field emission tips as shown at 14. However, it should be understood that the beam may be produced by any source, including, e.g., without limitation an ion gun, a tungsten filament, a cathode, a planar vacuum triode, an electron-impact ionizer, a laser ionizer, a chemical ionizer, a thermal ionizer, an ion-impact ionizer.

Figure 1B:
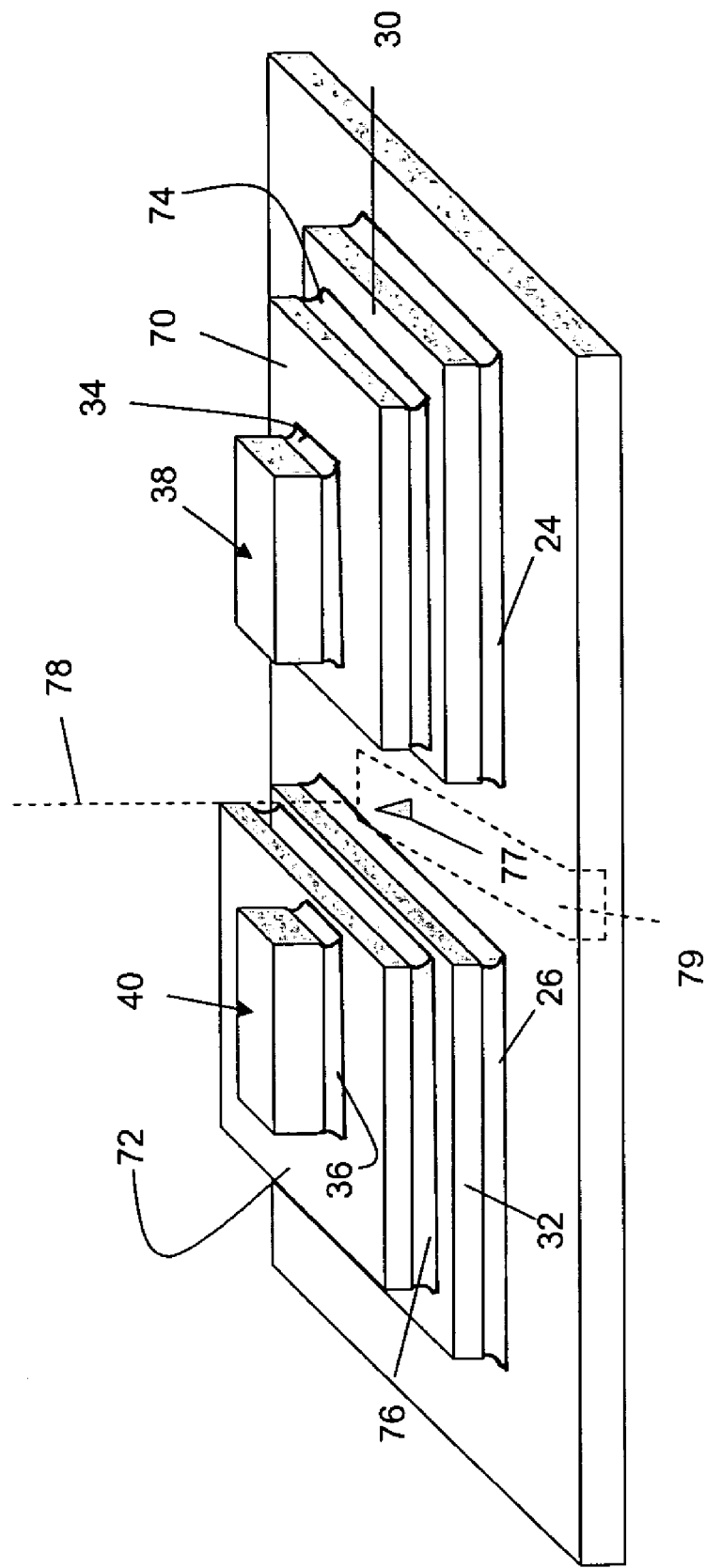
FIG. 1B is a schematic view of a nano-resonating energy emitting structure according to another embodiment of the present invention

FIG. 1B shows a second embodiment of the present invention and includes an additional set of anodes 70 and 72 as well as an additional insulating or dielectric material 74 and 76 located above anodes 30 and 32 but below the layer of dielectric material 34 and 36. The additional set of anodes 70 and 72 will act as an acceleration anode and provides the ability to have a voltage increase between the two sets of anodes, 30/34 and 70/72, from about 100 volts to about 40,000 volts, thereby increasing the speed of the beam of charged particles 78 emitted by the field emission tip 77, that is located on a conductive region 79.

Figure 2:
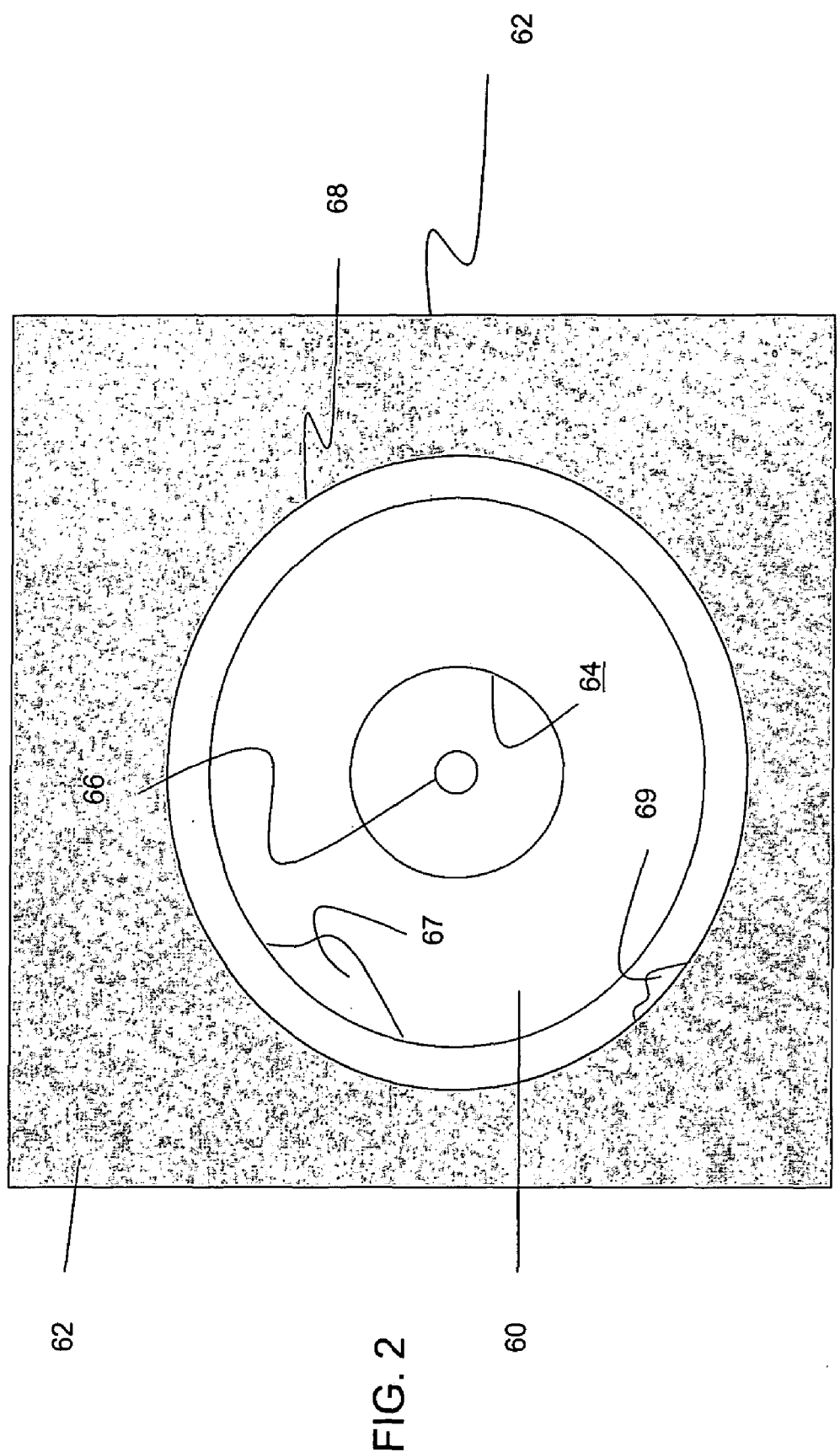
FIG. 2 is a schematic view of another embodiment of the present invention.

FIG. 2 shows a top plan view of an alternative form of the ultra-small structures according to the present invention, and shows an ultra-small structure in the form of a circular ring 60, formed on a substrate 62 with a hollow or open cavity 64 that extends down to the substrate 62 where a field emission tip 66 is positioned in the center of the structure 60 and of the open cavity 64. An anode, shown at 68, can also be in the form of ring and spaced below ring 60 by dielectric or insulating material 67 and above substrate 62 by suitable dielectric or insulating material 69. The invention includes having one ring 60 as well as a vertical stack of a plurality of the ultra-small resonant structures, for example in the form of segmented elements, segmented squares or rectangular shaped elements, rings, as in FIG. 3, discussed herein after, or other shapes. The stacked arrays can have any shape of the ultra-small resonant structures, and can be comprised of one or multiples thereof, as well as having a source of charged particles that can be directed there past to excite and cause or effect the resonating of the ultra-small resonant structures which then emit or produce EMR.

Figure 3:
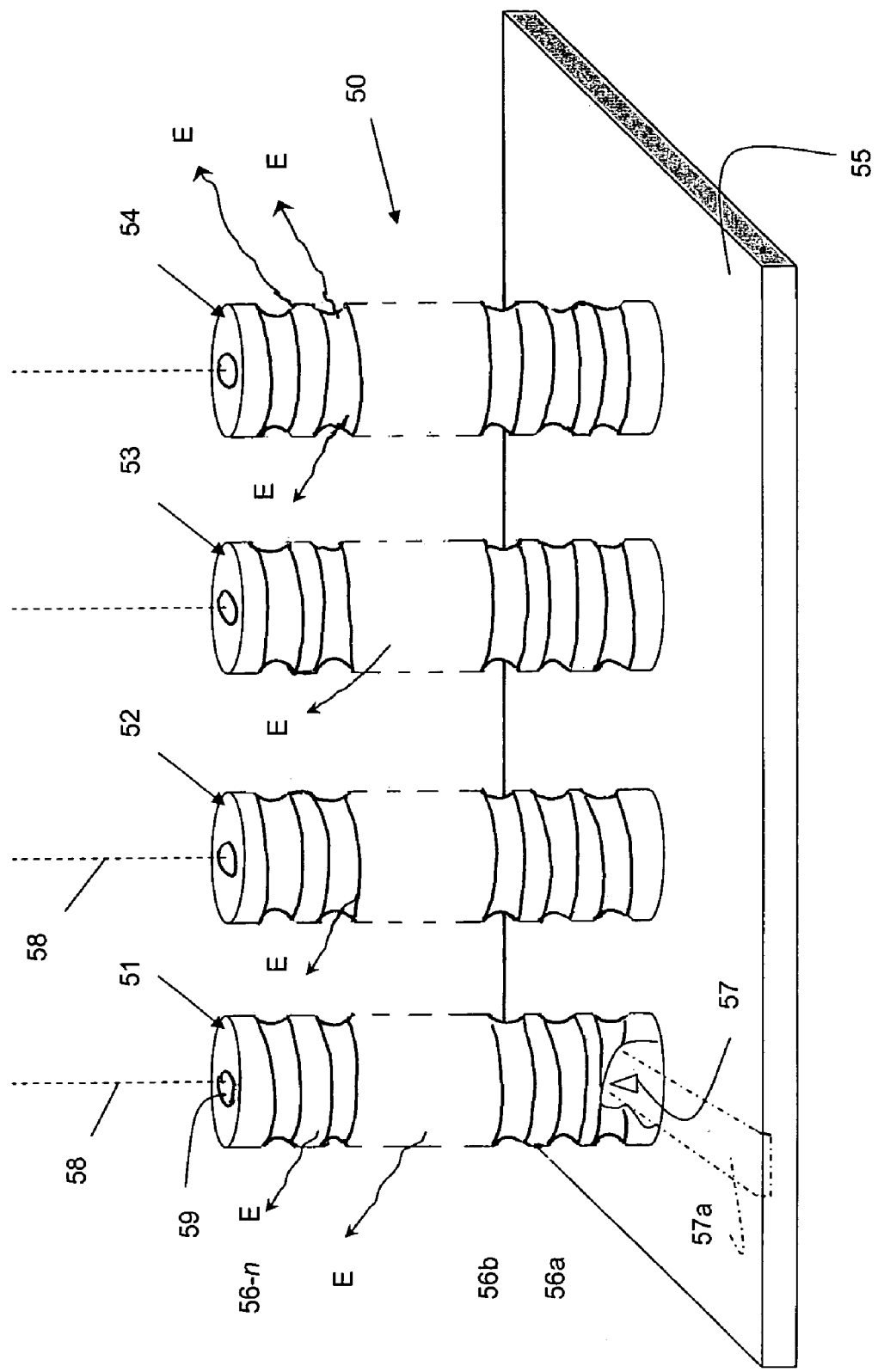
FIG. 3 is a diagrammatic showing of a plurality of vertically stacked arrays of ultra small resonant structures according to the present invention.

The present invention includes use of a plurality of the ultra-small resonant structures that are formed in a vertically stacked array, for example as is shown in the stacked array in FIG. 3 at 50. In this example, a plurality of vertical stacks, as shown at 51-54, of the ultra-small resonant structures could be arranged on a substrate 55, with each stack being comprised of a number of component substructures 56a, 56b, . . . ,56-n that are separated by layers of dielectric or insulating material 55a, 55b, . . . ,55-n. In operation, a beam of charged particles 58, for example produced from a field emission tip 57 that is energized via a conductive path 57a, passes through the center of the stacked array, through a central cavity 59 provided in each stacked array and in proximity to the stacked ultra-small nano-resonating structures 56a . . . 56-n causing excitation which causes nearby structures designed to be resonant at or near the frequency of radiation to resonate and thereby to produce electromagnetic radiation (denoted E in the drawing). Electromagnetic radiation may be coupled out of nano-resonating structures 56a . . . 56-n, .e.g., to some other structure; for example, the electromagnetic radiation may be coupled to an electromagnetic wave via a waveguide conduit, which might be, for example, an optical fiber or the like.

Figure 4:
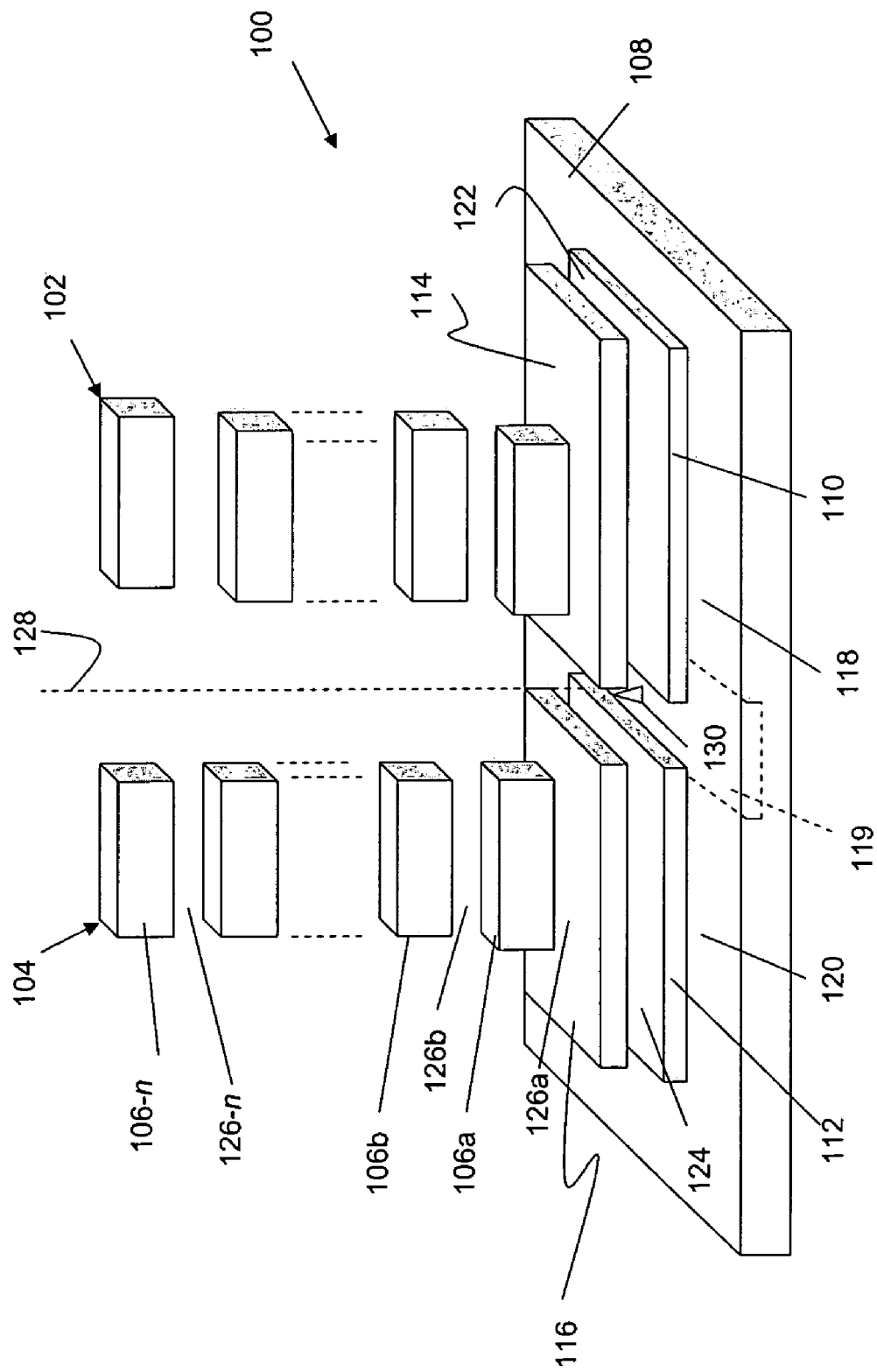
FIG. 4 is a diagrammatic showing of another form of vertical stacked array of ultra-small resonant structures according to the present invention.

In another example, as shown diagrammatically in FIG. 4, a stack of the structures 110 could be formed by suitable techniques, such as those noted above in the referenced applications (in particular as has been described in co-pending U.S. application Ser. Nos. 10/917,511 and Ser. No. 11/203, 407, both of which were previously referenced above and incorporated herein by reference). Each vertical stack, 102 and 104, for example, could employ a plurality of vertically arranged layers 106a, 106b, . . . , 106-n of ultra-small resonant structures formed on a substrate 108 together with layers of dielectric or insulating material 126a, 126b, . . . , 126-n there between each of the layers 106. The two stacks also include two sets of anodes 110 and 112 and 114 and 116, with intervening layers of dielectric or insulating material 118/120 and 122/124 there between, respectively. A beam of charged particles 128 can be produced by a source thereof such as, for example, a field emission tip 130, positioned on a conductive region 119, which produces the beam 128 so that it passes upwardly past the stacked array of ultra-small resonant structures 106a . . . 106-n so that each of the layered ultra-small resonant structures within the stack will resonate and emit EMR.

Figure 5:
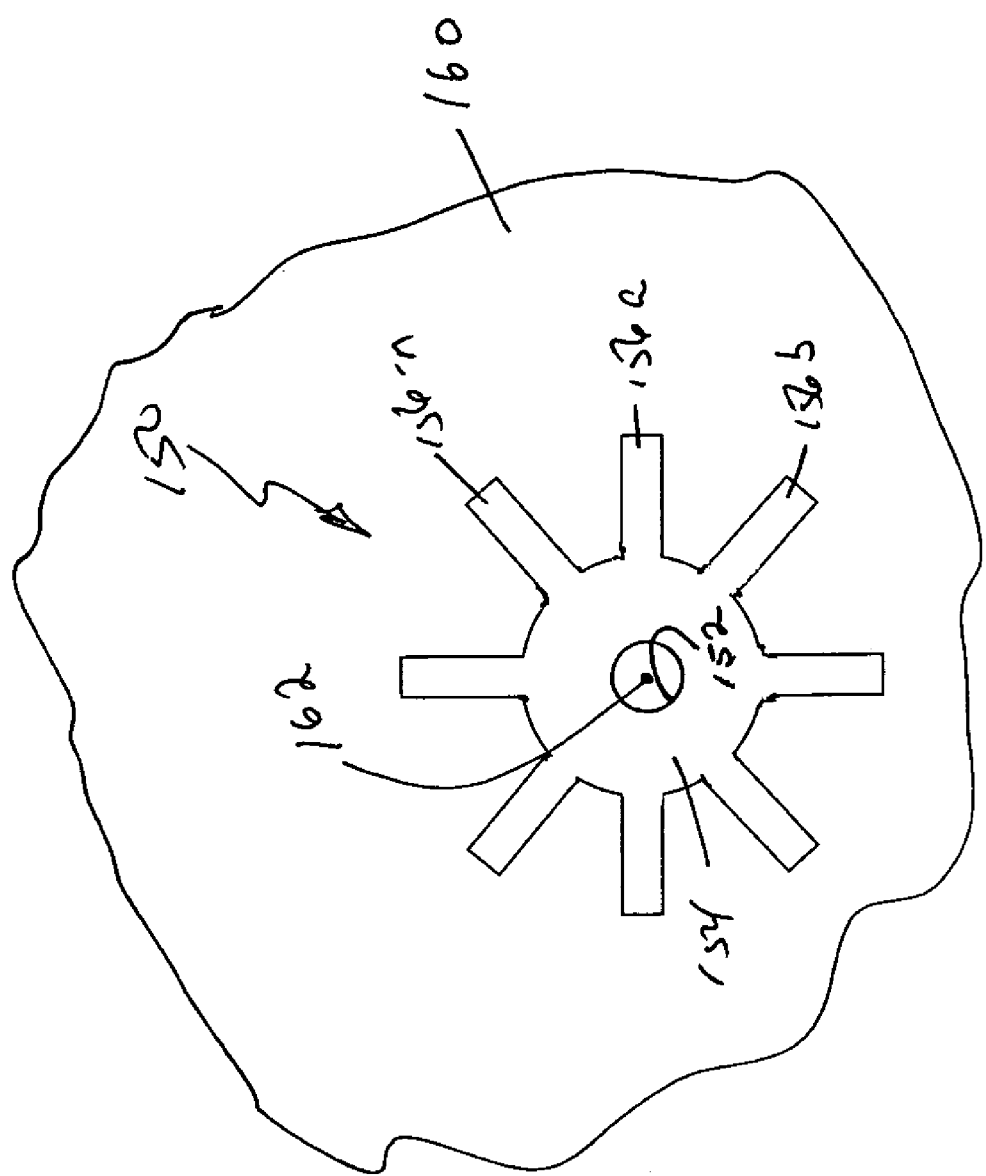
FIG. 5 shows another shape of ultra-small resonant structures according to the present invention.

FIG. 5 shows another cross-sectional shape 150 for the ultra-small resonant structures that begins with a central cavity 152, a central hub 154 and an exterior that has been divided into a plurality of equally spaced segments or arms 156a, 156b, . . . , 156-n, when viewed in a counter clockwise direction. The arms 156a-156-n and central portion 154 can be arranged in a vertical stack, similar to that shown in FIG. 2, with the central cavity 152 being formed so as to extend down the center of the stack of ultra-small resonant structures 150 to the substrate 160 so that a field emission tip or other source of a beam of charged particles can be positioned on substrate 160 at the bottom of cavity 152 with a resulting a beam 162 being generated and sent vertically up past the individual ultra-small resonant structures 150 in the stack. That charged beam will energize the ultra-small resonant structures 150 causing them to resonate and produce EMR.

Figure 6:
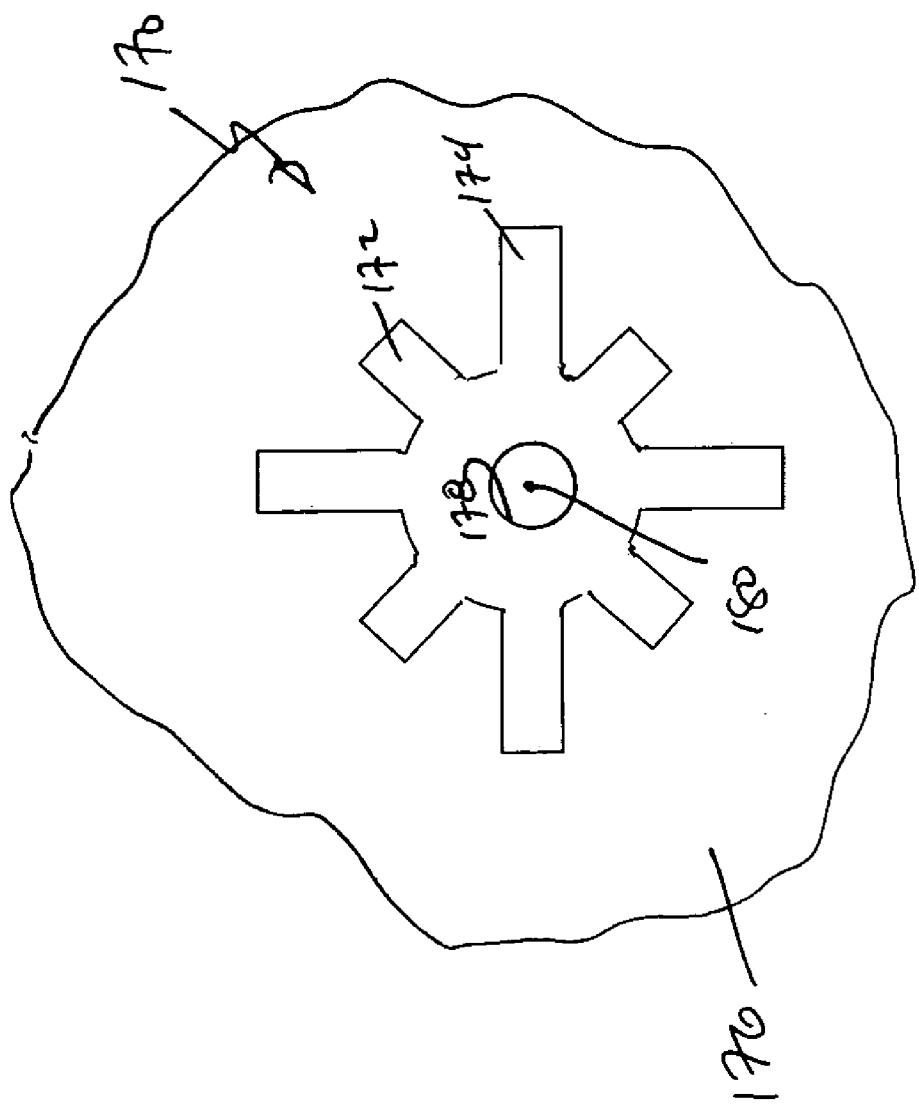
FIG. 6 shows yet another shape of ultra-small resonant structures according to the present invention

FIG. 6 shows an alternative form for the ultra-small resonant structures 170 where the outwardly extending arms have alternating lengths, some, as shown at 172, being short while others, as shown at 174, will be longer. Here again, a stacked array of these ultra-small resonant structures 170 can be formed on and supported by a substrate 176 and a central cavity 178 can extend downwardly from the top of the stack to the substrate 176 so that a charged particle beam 180 can be sent upwardly past the stacked ultra-small resonant structures and cause them to resonate and emit EMR.

While the ultra-small resonant structures, also referenced herein as nano-resonating substructures, have been shown with separated adjacent structures, circular, segmented and having outer fingers or segments, the nano-resonating substructures could also be C-shaped; semi-circular shaped; semi-ovular shaped; semi-rectangular shaped; and rectangular shaped.

Manufacture

The nano-resonating structures discussed herein can be constructed with many types of materials. Examples of suitable fabrication materials include silver, high conductivity metals, and high temperature superconducting materials. The material may be opaque or semi-transparent. In the above-identified patent applications, ultra-small structures for producing electromagnetic radiation are disclosed, and methods of making the same. In at least one embodiment, the resonant structures of the present invention are made from at least one layer of metal (e.g., silver, gold, aluminum, platinum or copper or alloys made with such metals); however, multiple layers and non-metallic structures (e.g., carbon nanotubes and high temperature superconductors) can be utilized, as long as the structures are excited by the passage of a charged particle beam. The materials making up the resonant structures may be deposited on a substrate and then etched, electroplated, or otherwise processed to create a number of individual resonant elements. The material need not even be a contiguous layer, but can be a series of resonant elements individually present on a substrate. The materials making up the resonant elements can be produced by a variety of methods, such as pulsed-plating, depositing or etching. Preferred methods for doing so are described in co-pending U.S. application Ser. Nos. 10/917,511 and Ser. No. 11/203,407, both of which were previously referenced above and incorporated herein by reference.

Exemplary dimensions for the ultra-small resonant structures and their respective spacing have also been set forth in the above referenced co-pending applications and will not be repeated herein. Those skilled in the art will realize that these dimensions are merely exemplary and are not intended to limit the scope of the invention in any way.

Further, the construction of the vertical stacks of ultra-small resonant structures, as set forth herein, can be manufactured by making the various layers one at a time, or the stacked layers could be formed and then the central opening could be formed as well as the final exterior shape by removing portions of the formed stack. It should also be understood that rows of vertically extending stacks, each comprised of a plurality of layered ultra-small resonant structures, can be, and are considered as, part of the invention. Such rows would then extend vertically, at about 90 degrees relative to the surface of the substrate, rather than horizontally. As an alternative, the vertically stacked arrays of ultra-small resonant structures, regardless of their shape or form, could also be disposed at an angle to the surface of the supporting substrate, such as, for example at an angle ranging from 1 degree to about 89 degrees, and preferably 10 degrees to about 80 degrees.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

We claim:

1. A nano-resonating structure comprising:
   a substrate;
   a source of charged particles supported by the substrate creating a beam of charged particles emanating in a direction outwardly from the substrate;
   an ultra-small resonant substructure supported by the substrate above the source of charged particles and having a face proximate to the source of charged particles, the face being indented by a cavity near but not in the path of the beam of charged particles, the cavity constructed and adapted to resonate at a frequency in excess of the microwave frequency when energy from the beam of charged particles passes by the cavity and to thereby transmit electromagnetic radiation at the frequency in excess of the microwave frequency outside the nano-resonating structure, a plurality of the ultra-small resonant substructures positioned next to one another in a stacked array, and a plurality of the stacked arrays positioned next to one another in at least two arrays.

2. The nano-resonant structure of claim 1 wherein each of said plurality of ultra-small resonant substructures has a shape selected from the group comprising:
   circular-shaped, C-shaped; U-shaped; semi-circular shaped; semi-ovular shaped; segmented-shaped; square-shaped; semi-rectangular shaped; and rectangular shaped.

3. The nano-resonant structure of claim 2 wherein all of the plurality of ultra-small resonant substructures have substantially the same shape.

4. The nano-resonant structure of claim 3 wherein all of the plurality of ultra-small resonant substructures have substantially the same dimensions.

5. The nano-resonant structure of claim 1 wherein said plurality of ultra-small resonant substructures are substantially equally spaced apart.

6. The nano-resonating structure of claim 1 wherein the stacked arrays are vertically stacked arrays.

7. The nano-resonant structure of claim 1 wherein a first of the two stacked arrays has a different number of ultra-small resonant substructures from a second of the two stacked arrays.

8. The nano-resonant structure of claim 1 wherein each of the two stacked arrays has the same number of ultra-small resonant substructures.

9. The nano-resonant structure as in claim 1 wherein the charged particles are selected from the group comprising: electrons, protons, and ions.

10. The nano-resonant structure of claim 1 wherein the two stacked arrays of structures are symmetric.

11. The nano-resonant structure of claim 1 wherein the two stacked arrays of structures are asymmetric.

12. The nano-resonant structure of claim 1 wherein the ultra-small resonant substructures are composed of one from the group of: metals, alloys, non-metallic conductors and dielectrics.

13. The nano-resonant structure of claim 1 wherein the arrays are positioned at an angle relative to the plane of the substrate.

14. The nano-resonant structure of claim 1, wherein the stacked arrays include:
 a first stack comprising:
  a first dielectric layer supported by the substrate;
  a first anode directly on top of the dielectric layer;
  a first insulating layer directly on top of the dielectric layer;
  a first ultra-small resonant structure on top of the first insulating layer; and
 a second stack comprising:
  a second dielectric layer supported by the substrate;
  a second anode directly on top of the dielectric layer;
  a second insulating layer directly on top of the dielectric layer;
  a second ultra-small resonant structure on top of the second insulating layer, wherein,
 the first and second stacks are proximate to but not touching the source of charged particles.

15. The nano-resonant structure of claim 1, wherein the stacked arrays include:
 a first stack comprising:
  a first plurality of alternating dielectric layers and anodes;
  a first insulating layer directly on top of the first plurality of alternating dielectric layers and anodes; and
  a first ultra-small resonant structure on top of the first insulting layer; and
 a second stack comprising:
  a second plurality of alternating dielectric layers and anodes;
  a second insulating layer directly on top of the second plurality of alternating dielectric layers and anodes; and
  a second ultra-small resonant structure on top of the second insulting layer, wherein,
 the first and second stacks are proximate to but not touching the source of charged particles.

16. A nano-resonating structure of comprising:
 a substrate;
 a source of charged particles supported by the substrate creating a beam of charged particles emanating a direction outwardly from the substrate;
 an ultra-small resonant substructure supported by the substrate above the source of charged particles and having a face proximate to the source of charged particles, the face being indented by a cavity near but not in the path of the beam of charged particles, the cavity constructed and adapted to resonate at a frequency in excess of the microwave frequency when energy from a the beam of charged particles passes by the cavity and to thereby transmit electromagnetic radiation at the frequency in excess of the microwave frequency outside the nano-resonating structure; and
 a sandwich, comprising:
  a dielectric layer supported by the substrate;
  an anode directly on top of the dielectric layer;
  an insulating layer directly on top of the dielectric layer; and
  the ultra-small resonant structure.

* * * * *